US009815501B2

(12) United States Patent
McCormack et al.

(10) Patent No.: US 9,815,501 B2
(45) Date of Patent: Nov. 14, 2017

(54) CARGO VEHICLE AND MOLDING ASSEMBLY FOR A CARGO VEHICLE

(71) Applicants: Daniel J. McCormack, Rincon, GA (US); Timothy P. Meyer, Bluffton, SC (US)

(72) Inventors: Daniel J. McCormack, Rincon, GA (US); Timothy P. Meyer, Bluffton, SC (US)

(73) Assignee: GREAT DANE LLC, Chicago, IL (US)

( * ) Notice: Subject to any disclaimer, the term of this patent is extended or adjusted under 35 U.S.C. 154(b) by 0 days.

(21) Appl. No.: 14/520,316

(22) Filed: Oct. 21, 2014

(65) Prior Publication Data
US 2016/0107706 A1   Apr. 21, 2016

(51) Int. Cl.
    B62D 33/04   (2006.01)
    B62D 25/06   (2006.01)
    B60Q 3/06    (2006.01)

(52) U.S. Cl.
    CPC ............. B62D 33/04 (2013.01); B60Q 3/06 (2013.01); B62D 25/06 (2013.01); B62D 33/046 (2013.01); B62D 33/048 (2013.01)

(58) Field of Classification Search
    CPC ...... B62D 33/04; B62D 33/046; B62D 25/06; B62D 33/048; B60Q 3/06
    See application file for complete search history.

(56) References Cited

U.S. PATENT DOCUMENTS

| 3,440,790 A | * | 4/1969 | Nerem | ...................... | E04C 2/32 |
| | | | | | 29/897.32 |
| 3,971,590 A | | 7/1976 | Yglesias | | |
| 4,565,071 A | | 1/1986 | Bartling et al. | | |
| 4,662,138 A | * | 5/1987 | Bryant | ................. | B62D 33/046 |
| | | | | | 52/282.4 |
| 4,763,984 A | | 8/1988 | Awai et al. | | |
| 4,947,293 A | | 8/1990 | Johnson et al. | | |
| 5,152,599 A | | 10/1992 | Lewis et al. | | |
| 5,219,217 A | | 6/1993 | Aikens | | |

(Continued)

FOREIGN PATENT DOCUMENTS

| CN | 102085828 A | 6/2011 |
| GB | 2336137 A | 10/1999 |
| WO | 9718105 A1 | 5/1997 |

OTHER PUBLICATIONS

Search Results and Written Opinion for corresponding International Application No. PCT/US2015/056099, dated Jan. 4, 2016.

(Continued)

*Primary Examiner* — Glenn Dayoan
*Assistant Examiner* — Melissa A Black
(74) *Attorney, Agent, or Firm* — Nelson Mullins Riley & Scarborough LLP

(57) ABSTRACT

A cargo compartment for use with a motorized vehicle, and a vehicle having a cargo compartment, have a floor, a roof, a first side wall, and a second side wall. Each side wall extends between the floor and the roof, defining intersections therebetween. A molding assembly is disposed in the intersection and has an elongated back portion and an elongated cover portion, so that the cover portion is disposed between the back portion and an interior cargo compartment.

41 Claims, 16 Drawing Sheets

(56) References Cited

U.S. PATENT DOCUMENTS

| | | |
|---|---|---|
| 5,351,990 A | 10/1994 | Thomas |
| 5,483,427 A | 1/1996 | Dealey, Jr. et al. |
| 5,491,377 A | 2/1996 | Janusauskas |
| 5,507,405 A | 4/1996 | Thomas et al. |
| 5,573,327 A | 11/1996 | Dealey, Jr. et al. |
| 5,647,658 A | 7/1997 | Ziadi |
| 5,678,914 A | 10/1997 | Dealey et al. |
| 5,704,676 A | 1/1998 | Hill |
| 5,752,760 A | 5/1998 | Dealey, Jr. et al. |
| 5,772,276 A | 6/1998 | Fetz et al. |
| 5,857,758 A | 1/1999 | Dealey, Jr. et al. |
| 5,915,830 A | 6/1999 | Dickson et al. |
| 5,976,613 A | 11/1999 | Janusauskas |
| RE36,642 E | 4/2000 | Ziadi |
| 6,152,586 A | 11/2000 | Dealey, Jr. et al. |
| 6,238,075 B1 | 5/2001 | Dealey, Jr. et al. |
| 6,250,785 B1 | 6/2001 | Mallia et al. |
| 6,270,150 B1 | 8/2001 | Miller et al. |
| 6,276,634 B1 | 8/2001 | Bodle |
| 6,402,353 B2 | 6/2002 | Dealey, Jr. et al. |
| 6,474,851 B1 | 11/2002 | Baley |
| 6,505,963 B1 | 1/2003 | Chiang |
| 6,565,244 B1 | 5/2003 | Murphy et al. |
| 6,577,794 B1 | 6/2003 | Currie et al. |
| 6,607,237 B1 | 8/2003 | Graaff et al. |
| 6,655,824 B2 | 12/2003 | Tufte |
| 6,733,161 B2 | 5/2004 | Tufte |
| 6,817,731 B2 | 11/2004 | Tufte |
| 6,869,202 B2 | 3/2005 | Tufte |
| 6,883,931 B2 | 4/2005 | Tufte |
| 6,921,184 B2 | 7/2005 | Tufte |
| 6,923,493 B2 | 8/2005 | Buchholz et al. |
| 6,979,051 B2 | 12/2005 | Jones et al. |
| 6,997,594 B2 | 2/2006 | Grothe et al. |
| 7,025,408 B2 | 4/2006 | Jones et al. |
| 7,025,481 B2 | 4/2006 | Moll |
| 7,055,892 B2 | 6/2006 | Buchholz et al. |
| 7,100,971 B2 | 9/2006 | Pines |
| 7,134,773 B2 | 11/2006 | Tufte |
| 7,220,011 B2 | 5/2007 | Hurwitz |
| 7,237,932 B2 | 7/2007 | Ter-Hovhannissian |
| 7,258,391 B2 | 8/2007 | Graaff et al. |
| 7,258,472 B2 | 8/2007 | Tufte |
| 7,291,852 B1 | 11/2007 | Matlack et al. |
| 7,401,949 B2 | 7/2008 | Tufte |
| 7,452,114 B2 | 11/2008 | Gasquet |
| 7,494,177 B2 | 2/2009 | Henning |
| 7,575,499 B2 | 8/2009 | Tufte |
| 7,582,000 B2 | 9/2009 | Pendlebury et al. |
| 7,901,537 B2 | 3/2011 | Jones et al. |
| 7,980,739 B2 | 7/2011 | Iwai et al. |
| 2007/0206386 A1* | 9/2007 | Ehrlich .............. B60Q 3/06 362/485 |
| 2008/0190066 A1* | 8/2008 | Rajewski ........... B62D 33/046 52/588.1 |
| 2009/0139167 A1* | 6/2009 | Donaldson ......... B62D 33/046 52/272 |
| 2013/0207413 A1 | 8/2013 | Lookebill et al. |

OTHER PUBLICATIONS

How Does Light Tape Work?, Light Tape, www.lighttape.com., Apr. 22, 2014.

* cited by examiner

CARGO VEHICLE AND MOLDING ASSEMBLY FOR A CARGO VEHICLE

FIELD OF THE INVENTION

The present invention is directed to molding assemblies for use in cargo spaces of various vehicles, and cargo vehicles having molding assemblies.

BACKGROUND OF THE INVENTION

It is known to provide lighting systems in the cargo areas of various cargo vehicles, for example in those instances where the dimensions or construction of the cargo space inhibit the ability to utilize natural light or the vehicle is used at night. For instance, the length of some trailers, such as ones used with semi-trailers, or tractor trailers, may cause those areas within the trailer that are not adjacent an opening, such as a doorway, to be inadequately lit. As well, in some cargo vehicles such as refrigerated trailers with multiple cooling zones that utilize movable partitions to create the various zones, internal trailer structures may prevent light from light sources restricted to the locations of intermittent fixtures from adequately reaching the extents of the trailer's volume. For example, a zone may be created that does not include one of the intermittently spaced lighting sources.

The present invention recognizes and addresses considerations of prior art constructions and methods.

SUMMARY OF THE INVENTION

In one embodiment of the present invention, a cargo compartment for use with a motorized vehicle has a floor, a roof, and a first side wall extending between the floor and the roof that defines a first intersection between the roof and the first side wall. A second side wall extends between the floor and the roof, defining a second intersection between the roof and the second side wall. The floor, the roof, the first side wall and the second side wall define a cargo compartment. A first molding assembly disposed in the first intersection has a back portion that is elongated in a direction parallel to the first intersection and that extends between a surface of the first side wall facing the cargo compartment and a surface of the roof facing the cargo compartment. The back portion is attached to the surface of the first side wall at a position on the surface of the first side wall offset from the first intersection and to the surface of the roof at a position on the surface of the roof offset from the first intersection. A cover portion is elongated in the direction parallel to the first intersection and is attached to the back portion so that the cover portion is disposed between the cargo compartment and a face of the back portion facing toward the cargo compartment.

In another embodiment of the present invention, a cargo compartment for use with a motorized vehicle has a floor, a roof, a first side wall extending between the floor and the roof, and a second side wall extending between the floor and the roof and opposing the first side wall. A front wall extends between the floor and the roof and extends between the first side wall and the second side wall. A rear frame is attached at least to the floor and the roof opposite the front wall. At least one intersection is defined between a first surface of one of the floor, the roof, the first side wall, the second side wall, the front wall, and the rear frame, and a second surface of one other of the floor, the roof, the first side wall, the second side wall, the front wall, and the rear frame. A first molding assembly is disposed in the at least one intersection and has a back portion that is elongated in a direction parallel to the at least one intersection and that extends between, and is attached to at least one of, the first surface and the second surface. A cover portion is elongated in the direction parallel to the at least one intersection and is attached to the back portion so that the cover portion is disposed between the cargo compartment and a face of the back portion facing toward the cargo compartment. The cover portion includes a light source disposed on at least a portion of a face of the cover portion facing the cargo compartment.

In a further embodiment of the present invention, a cargo vehicle has a wheeled chassis, a floor disposed on the chassis and a roof, and a first side wall extending between the floor and the roof that defines a first intersection between the roof and the first side wall. A second side wall extends between the floor and the roof, defining a second intersection between the roof and the second side wall. The floor, the roof, the first side wall and the second side wall define a cargo compartment. A first molding assembly disposed in the first intersection has a back portion that is elongated in a direction parallel to the first intersection and that extends between a surface of the first side wall facing the cargo compartment and a surface of the roof facing the cargo compartment. The back portion is attached to the surface of the first side wall at a position on the surface of the first side wall offset from the first intersection and to the surface of the roof at a position on the surface of the roof offset from the first intersection. A cover portion is elongated in the direction parallel to the first intersection and is attached to the back portion so that the cover portion is disposed between the cargo compartment and a face of the back portion facing toward the cargo compartment.

In a still further embodiment of the present invention, a cargo vehicle has a wheeled chassis, a floor disposed on the chassis, a roof, a first side wall extending between the floor and the roof, and a second side wall extending between the floor and the roof and opposing the first side wall. A front wall extends between the floor and the roof and extends between the first side wall and the second side wall. A rear frame is attached at least to the floor and the roof opposite the front wall. At least one intersection is defined between a first surface of one of the floor, the roof, the first side wall, the second side wall, the front wall, and the rear frame, and a second surface of one other of the floor, the roof, the first side wall, the second side wall, the front wall, and the rear frame. A first molding assembly is disposed in the at least one intersection and has a back portion that is elongated in a direction parallel to the at least one intersection and that extends between, and is attached to at least one of, the first surface and the second surface. A cover portion is elongated in the direction parallel to the at least one intersection and is attached to the back portion so that the cover portion is disposed between the cargo compartment and a face of the back portion facing toward the cargo compartment. The cover portion includes a light source disposed on at least a portion of a face of the cover portion facing the cargo compartment.

In a further embodiment of the present invention, a cargo vehicle has a floor, a roof that is substantially parallel to the floor, and a first side wall extending between the floor and the roof. An intersection of the first side wall and the roof defines a first corner. A first lighting assembly has a first back portion that is elongated in the direction of the intersection and that includes an elongated first web having an elongated retention recess and an elongated second web having an elongated retention recess that intersect at a corner. The first back portion is fixed in the first corner of the cargo compartment with the first web in abutment with the first side wall structure and the second web in abutment with the roof structure. A cover portion is elongated in the direction and includes an elongated first web defining a retention flange disposed along its distal edge, an elongated second web defining a retention flange disposed along its distal edge, and an elongated light retention track extending between the first web and the second web of the cover portion. A light source on a substrate is elongated in the direction and is received within the light retention track of the cover portion. The retention flange of the first web of the cover portion is received in the retention recess of the first web of the back portion, and the retention flange of the second web of the cover portion is received in the retention recess of the second web of the back portion, so that the cover portion is removably secured to the back portion.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1A:
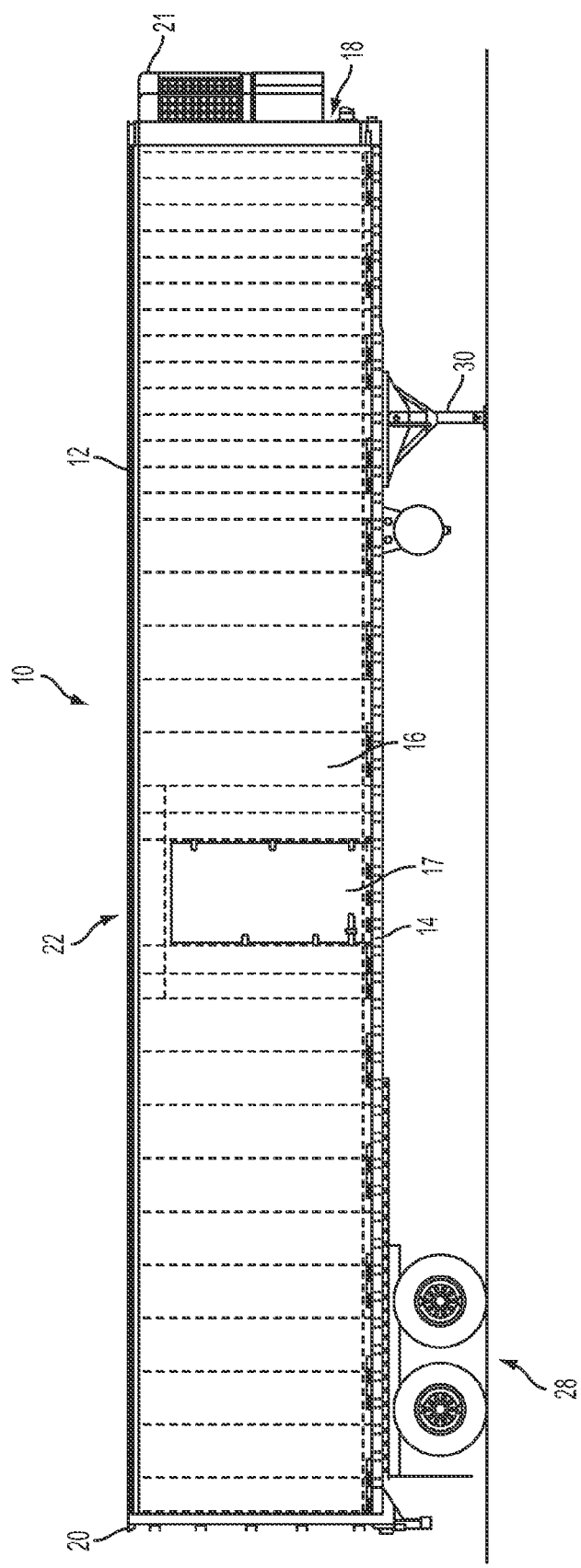
FIGS. 1A and 1B are side and perspective views of a cargo trailer including a lighting assembly in accordance with an embodiment of the present disclosure.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment.

Figure 1B:
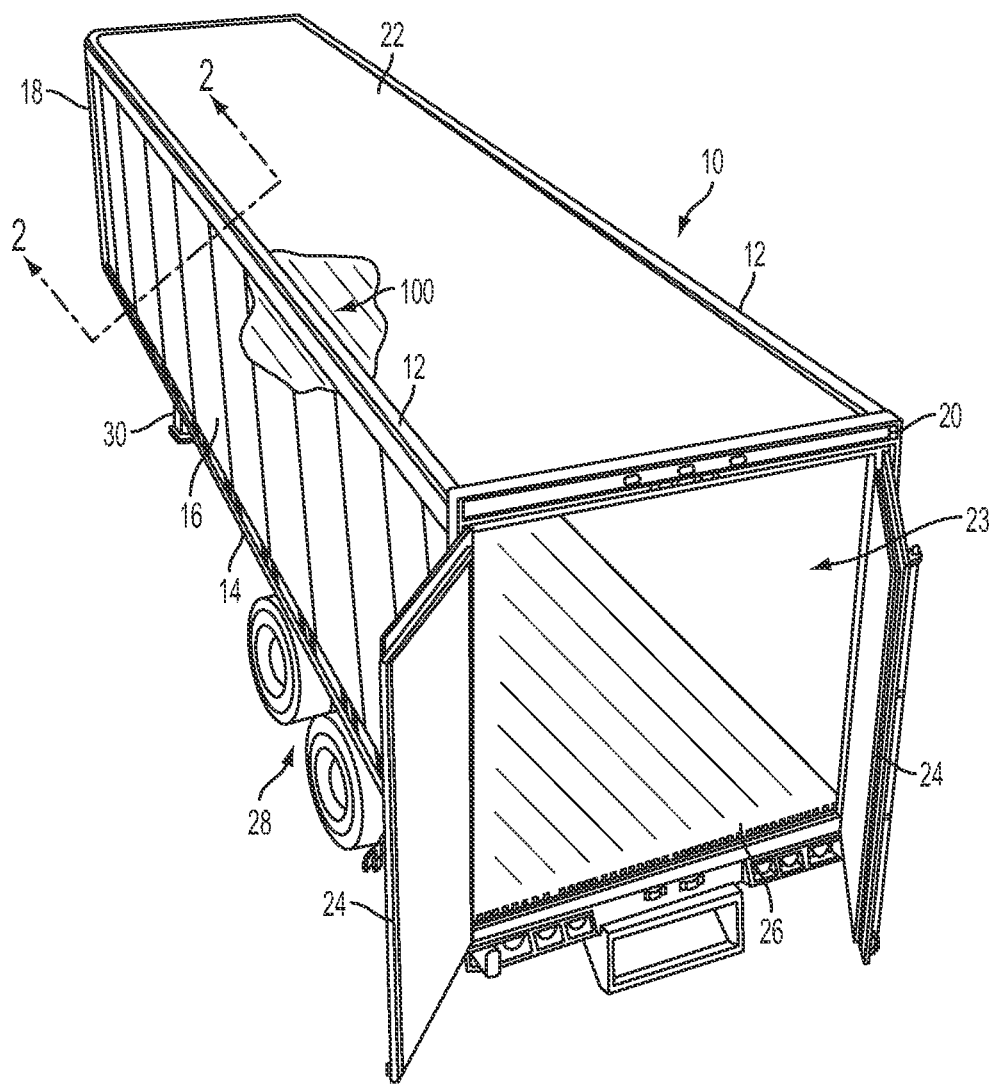

Referring now to FIGS. 1A and 1B, an insulated refrigerated trailer including a molding/lighting assembly 100 in accordance with an embodiment of the present invention is illustrated generally at 10. Refrigerated trailer 10 has a floor 26, two opposing side walls 16 on either side of the floor assembly that have similar (but oppositely oriented) constructions, and a roof 22. Two top rails 12 attach roof 22 to the two side walls 16, respectively, and two bottom rails 14 connect floor assembly 26, including the trailer's deck structure, to the side walls. The trailer includes a front wall assembly 18 and a rearward end frame assembly 20. Two doors 24 at the trailer's rearward end are pivotally connected to rear end frame assembly 20, although it should be understood that a roll-type door may also be used. Additionally, a side door 17 is pivotally connected to a frame portion disposed in one of the side wall assemblies 16. The assembled trailer defines an interior cargo compartment by the assembled side wall assemblies, front wall assembly, rear doors, and roof. A refrigeration unit 21 mounted in forward wall assembly 18 outputs conditioned air to the interior cargo compartment. The terms "side wall assembly," "front wall assembly," and "rear door" are used in the present discussion for purposes of explanation, and it should be understood that the terms may refer to, but are not limited to, a refrigerated van type trailer, as discussed with regard to FIGS. 1A and 1B, or other refrigerated and/or insulated van type trailers or containers, dry freight van trailers such as sheet-and-post type trailers or plate-type trailers, un-insulated containers, or refrigerated, insulated, or un-insulated truck bodies. In certain embodiments described herein, the lighting assembly is utilized with a container on a chassis or with a semi-trailer having an integrated chassis and cargo body. As should be understood, a semi-trailer has a plurality of rear axles so that the trailer's weight is supported in the rear by wheels on the axles but has in the front a king pin or other connection, without a front axle, so that the trailer's load in the front is supported by a tractor that pulls the trailer or, when the trailer is free-standing, by retractable legs attached to the floor assembly.

Molding/lighting assemblies as disclosed herein may also be used, however, with containers. An insulated or un-insulated cargo container also has a floor, two side walls, and a roof, with two top rails attaching the roof to the respective side walls and two bottom rails connecting the floor to the respective side walls, where the roof, floor, and side walls form a box having a generally rectangular cross-section when viewed from the rear. Unlike a van-type trailer, the container removably rests on a separate chassis formed by one or more longitudinal beams extending between retractable legs and a plurality of axled wheels. The wheels support the container's rearward end, and facilitate the container's movement, when the container, supported by the chassis, is coupled to a tractor. Containers differ from van-type trailers in that, among other things, the van trailer has an integral chassis and suspension, and does not have frames that are configured to permit the lifting and stacking of the container as a standalone box, without the chassis, as should be understood in this art.

Thus, it should be understood that the references in the present discussion to semi-trailers, and more specifically refrigerated semi-trailers, are for purposes of example only and that the molding/lighting assemblies described herein may be used with any of various constructions of trailers, containers, truck bodies, rail cars, panel vans, or similar cargo bodies and/or cargo vehicles.

Returning to dry freight and refrigerated van type trailers, the distance between the outer surfaces of the opposing side walls (i.e. the width of the trailer) can vary but is generally around 100 inches, for example 96 inches or 102.36 inches. Wall thickness can vary, particularly with regard to whether the trailer is a refrigerated trailer or a dry freight trailer, and if dry freight whether the trailer is of a sheet-and-post or plate type construction. For example, wall thicknesses of refrigerated trailers can generally vary between 1.5 inches to four inches and in some cases up to about six inches. Dry freight trailer wall thicknesses are generally less than refrigerated trailer wall thickness, due to the absence of insulation in the walls, and can be as thin as 6 millimeters (not considering side rails) in the case of plate-type trailers having composite plates. The top and bottom rails generally reduce the usable interior width of the trailer in addition to the thickness to the wall, e.g. about 0.35 inches per wall.

In a dry freight sheet-and-post type trailer, a plurality of elongated vertical posts attach to and extend between the top rail and bottom rail. Inner wall panels attach to and extend between adjacent vertical posts on the posts' front sides, while an outer skin of each side wall attaches to the posts' rear surfaces and faces the trailer's exterior. The inner wall panels, floor, and roof wall define the interior cargo compartment. The outer skin may be formed of aluminum but could also be formed of plastic, stainless steel, metal alloy, fiberglass, or another other tough material. The inner wall may be formed of plywood but could also be formed from fiber reinforced or other polymer, laminates, or other suitable materials. The outer skin (in one embodiment, a plurality of generally rectangular nominal 0.050 inch aluminum sheets) is fastened to the vehicle's top rail and bottom rail. Inner wall panels may or may not connect to the top and bottom rails. The inner wall panels and outer skin are connected by the elongated vertical posts and rivets. It should be understood, however, that screws or other suitable alternatives to rivets could be used to connect the inner wall panels and outer wall to the vertical posts. The outer skin, which can be formed as a single sheet or in sections, connects to the bottom rail by rivets or other suitable means. The wheel assembly supports the floor. A scuff band may cover the bottom portion of the trailer's interior side wall. In a plate type trailer, rectangular metal or composite plates extend between the top and bottom rails. The plates may attach directly to each other, e.g. via an overlapping joint, or the plates may abut at their sides and be connected by vertically aligned logistics posts situated at the plate intersections. Although a plate trailer may have such vertical logistics posts, the plates, rather than the posts, transfer load between the top and bottom rails.

In a sheet-and-post refrigerated trailer, a continuous or sectioned outer skin is attached to a series of vertical posts. A sectioned or continuous inner liner is spaced apart from the outer skin/post construction (i.e., unlike a sheet-and-post dry freight construction, the inner liner is spaced from the vertical posts), and thermal insulating foam is blown or poured into a space between the outer skin and the inner liner panel. The inner liner panel may be attached to the wall structure at the wall's periphery but is also held to the wall by the foam insulation, which may attach to a scrim layer, adhesive, or other mechanical fastening structure at the inner surface of the inner liner panel. Fitted together in this manner, the outer skin, foam core, and inner liner panel provide structural support to the side wall between the top and bottom rails, forming a frameless (or monocoque) construction. The inner liner panel can be of a composite construction, including a thermoplastic layer and a metallic layer that, in conjunction with the metal outer skin, inhibits outgassing of the foam gas from the foam core.

In the various trailers or non-chassis cargo bodies, the top and bottom rails may be formed by aluminum via extrusion. The bottom rail connects the side walls to the floor system or deck structure. As noted, a scuff plate may fit over the lower edge of the interior surface of the wall, and the scuff plate bottom edge may overlap a corrugated metal, wood, or other floor structure. The wall may be fastened to the bottom rail by screws, rivets, tapit pins, or other suitable attachment method. In a dry freight or refrigerated trailer, a plurality of transverse cross members (typically I-beam shaped) extend under the floor and are riveted or bolted to and between the two bottom rails. The transverse cross members, in conjunction with the wheels and retractable legs form the trailer's supporting structure or chassis. In a refrigerated trailer, the floor may include insulated polyurethane rigid foam material disposed between a fiberglass sub-floor and an upper extruded aluminum decking.

The roof wall may be constructed with horizontally aligned posts, or roof bows, to which an outer skin may be attached but and with or without inner liner panels. For example, a plurality of elongated, parallel roof bows may extend between opposing top rails on either side of the trailer. In a dry freight trailer in which there are no inner wall panels, the roof bows' inner front sides face directly in to the cargo area. The outer skin, which may be attached to the roof bows' outward (with respect to the trailer's cargo area) surfaces by an adhesive, may be formed of aluminum but could also be formed of a polymer, stainless still, metal alloy, fiberglass, or other tough material. The outer skin (in one preferred embodiment, a nominal 0.040 inch aluminum skin) is fastened to the opposing top rails. Inner wall panels, for example 0.25 inch plywood sheets, may be attached to the roof bows' inward surfaces so that the panels define the top of the cargo area. The inner wall panels extend between, but may or may not attach to, the opposing walls, the top rails, or the roof. Logistics tracks may or may not attach to the opposing top rails. Attachments between the inner wall panels and the top rails, between the inner wall panels and the roof bows, between the outer skin and the roof bows, between the outer skin and the top rails, between the roof bows and the top rails, and between the logistics tracks and the roof bows (as with corresponding attachments in the side walls and front wall) may be effected by rivets, adhesive or other suitable means. In other configurations, the roof wall construction, including inner skin, roof bow, and inner liner, may be constructed in the same manner as the side wall. For instance, in a refrigerated trailer, the outer skin, roof bow, inner liner panel, and intervening foam or other insulation may be the same as the outer skin, roof bow, inner liner panel, and insulation configuration of the side walls. Similarly, the front wall can extend between top and bottom rails transverse to the side top and bottom rails and may be constructed, for a given trailer type, in the same manner as the side walls for that trailer.

The terms "inward" and "outward," and similar relative spatial terms, are defined relative to the cargo body's interior cargo space. Moreover, the term "or" as used in this application and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Accordingly, and as should be understood from the discussion above and otherwise herein, it should be understood that the molding/lighting systems as described herein can be used with the wall structures, and particularly with the wall and roof structures, of various types of cargo carriers and cargo vehicles, for example with the walls of containers, truck bodies, or other walled cargo carrying enclosures transported by wheeled or other conveyances, such walled enclosures being generally referred to herein as "cargo bodies." A "cargo vehicle" is a wheeled conveyance, such as a van-type trailer or a container trailer chassis that includes or otherwise conveys a cargo body. Some, non-limiting examples of cargo body and cargo vehicle constructions in which the lighting systems as described herein may be utilized are described in U.S. Pat. Nos. 7,901,537, 7,258, 391, 7,100,971, 7,025,408, 6,979,051, 6,923,493, 6,607,237, 6,270,150, 5,772,276, 5,704,676, 5,351,990, 5,507,405, 4,565,071, and 3,971,590, the disclosure of each of which is incorporated herein for all purposes.

Referring again to FIGS. 1A, 1B, and 2, each side wall structure 16 may include an outer skin 31 formed of aluminum, an inner liner 34 as described in U.S. Patent Pub. No. 2013/0207412, the contents of which are incorporated herein in their entirety, vertical posts 35 disposed therebetween, and foam insulation. Front wall assembly 18, including refrigeration unit 21, and rear frame assembly 20 are connected on opposite ends of the top and bottom rails 12 and 14. Roof assembly 22 and rear doors 24 for permitting entry and exit of cargo into and out of interior cargo compartment 23 cooperate with floor assembly 26 to form a monocoque construction insulated refrigerated trailer. Roof assembly 22 may be constructed similarly to side wall assemblies 16, having an aluminum outer skin 36, an inner liner 38, a plurality of roof bows 40 and foam insulation disposed therebetween. As noted above, inner liners 34 and 38 are spaced from the inward surfaces 37 and 39, respectively, of vertical posts 35 and roof bows 40. Attached to intermittent (e.g. about every three to four feet) vertical posts and roof bows are foam dams 41. The foam dams are semi-rigid but resilient polymer sheets that extend between the vertical post (attached to the side facing the inner liner panel) or roof bow (attached to the bottom of the roof bow perpendicular to the inner liner panel) to which the foam dam is attached and abut the opposing surface of the inner liner panel to in part define the discrete compartments in the wall/roof assembly interior volume in which the uncured foam may be injected or poured during the assembly of the wall or roof. As indicated, holes may be provided through which gas may escape during foaming (but that are covered with a material that blocks foam from escaping). The processes of foaming walls and roofs of refrigerated trailers are not, in and of themselves, part of the present invention, although they may be employed in cargo bodies and vehicles of the present invention, and are therefore not discussed in further detail herein. Trailer 10 also includes running gear assembly 28 and front support members 30, as should be understood in the art.

Top rail 12 is constructed of two parts 12a and 12b. Part 12a is constructed with side wall 16, while part 12b is constructed with roof 22 and attached to part 12a by rivets 43 at the trailer's assembly. A block or rail 45 of pre-formed insulating material, which may be a polystyrene or urethane material, extends the top length of top rail part 12a and inner liner panel 34. A block or rail 47 of the same or similar material extends along the side length of top rail part 12b and inner liner panel 38. Rails 45 and 47 form edges of the respective volumes within the side wall and roof assemblies that contain insulating foam. Rail 47 is carried in a polymer holder 51 that, as illustrated in FIG. 2, may receive more than one such rail if desired.

Figure 2:
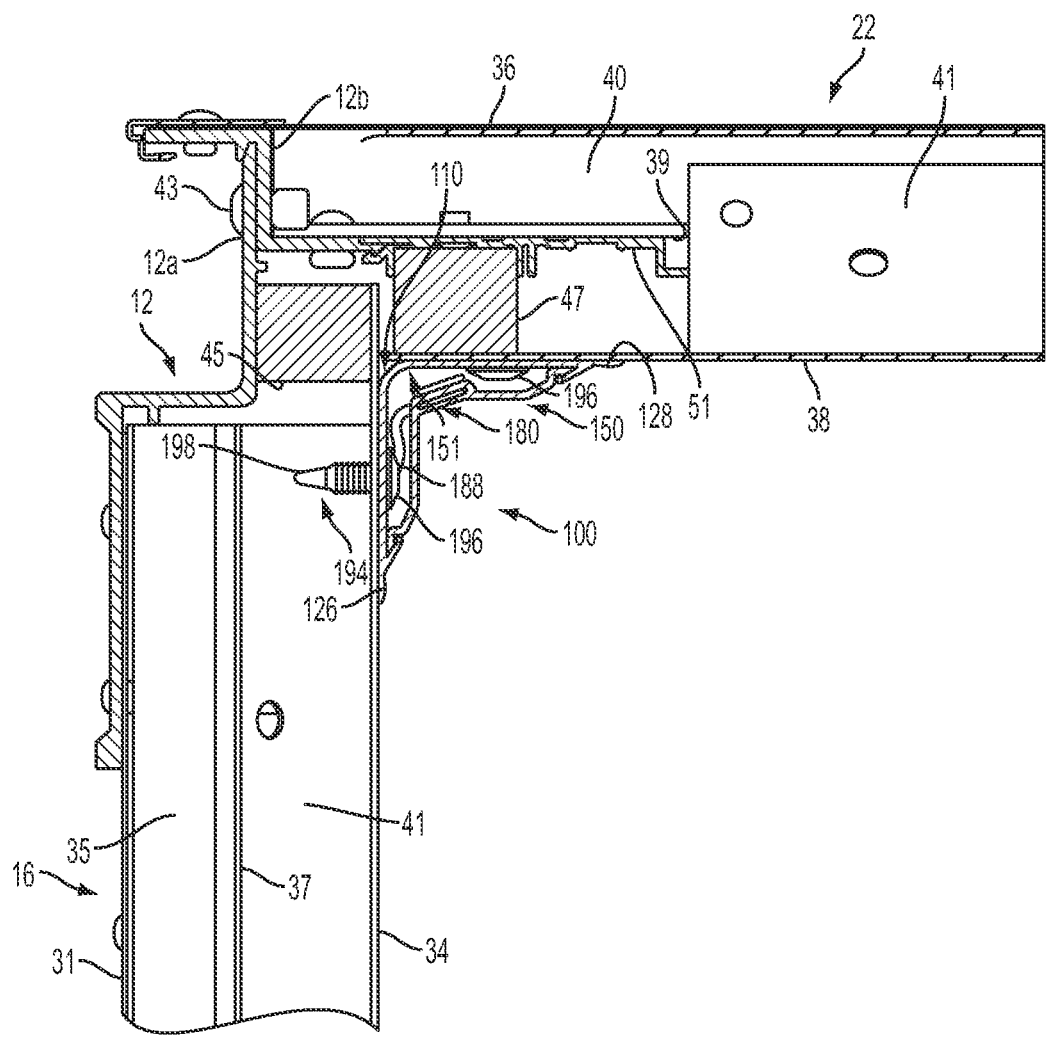
FIG. 2 is a partial, cross-sectional view of the cargo trailer and lighting assembly shown in FIG. 1B, taken along line 2-2.
Figure 14:
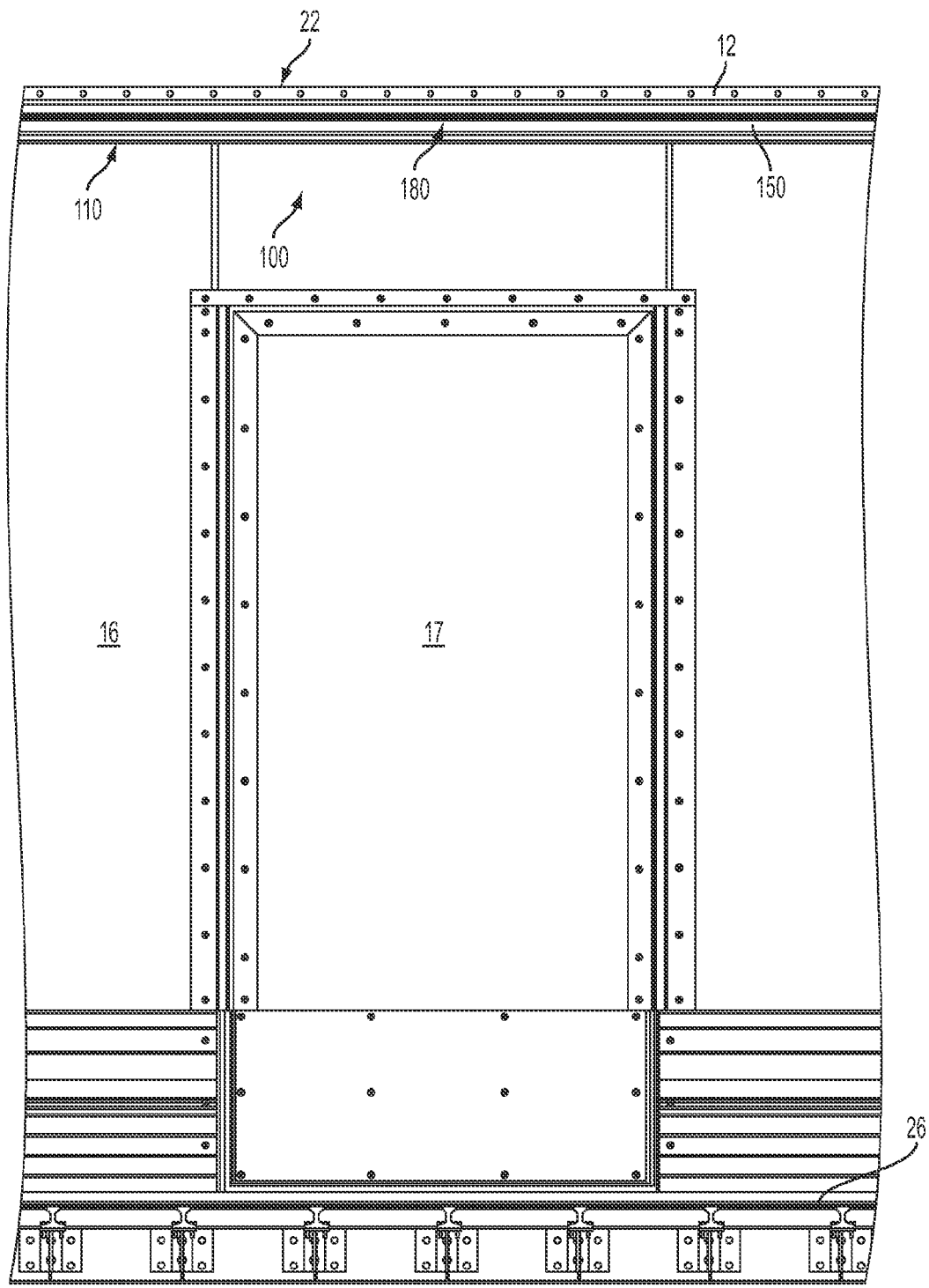
FIG. 14 is a partial interior view of the cargo trailer and lighting assembly shown in FIGS. 1A and 1B.

As shown in FIG. 2, molding/lighting assemblies 100 (only one shown) in accordance with certain embodiments of the present disclosure may extend along the top inside corners of the trailer that are formed by the intersection of side wall assemblies 16 with roof assembly 22. Referring additionally to FIG. 14, a molding/lighting assembly 100 is preferably disposed along the top inside corner of the trailer above side door 17. As used herein, a "corner" encompasses an intersection of two surfaces, for example two generally planar surfaces (or, where there is a slight gap between the surfaces, an intersection of the planes of such surfaces), but may also encompass an intersection of three surfaces. Referring additionally to FIG. 14, a molding/lighting assembly 100 is preferably disposed along the top inside corner of the trailer above side door 17. While in the present examples the molding assembly extends along the intersection between a side wall and the roof, it should be understood that the molding assembly could also be disposed vertically, between a side wall and the rear frame and/or the front wall, or between the front wall and the roof, or horizontally between the rear frame and the roof, or inclined about a door or other rear or side opening.

Figure 3A:
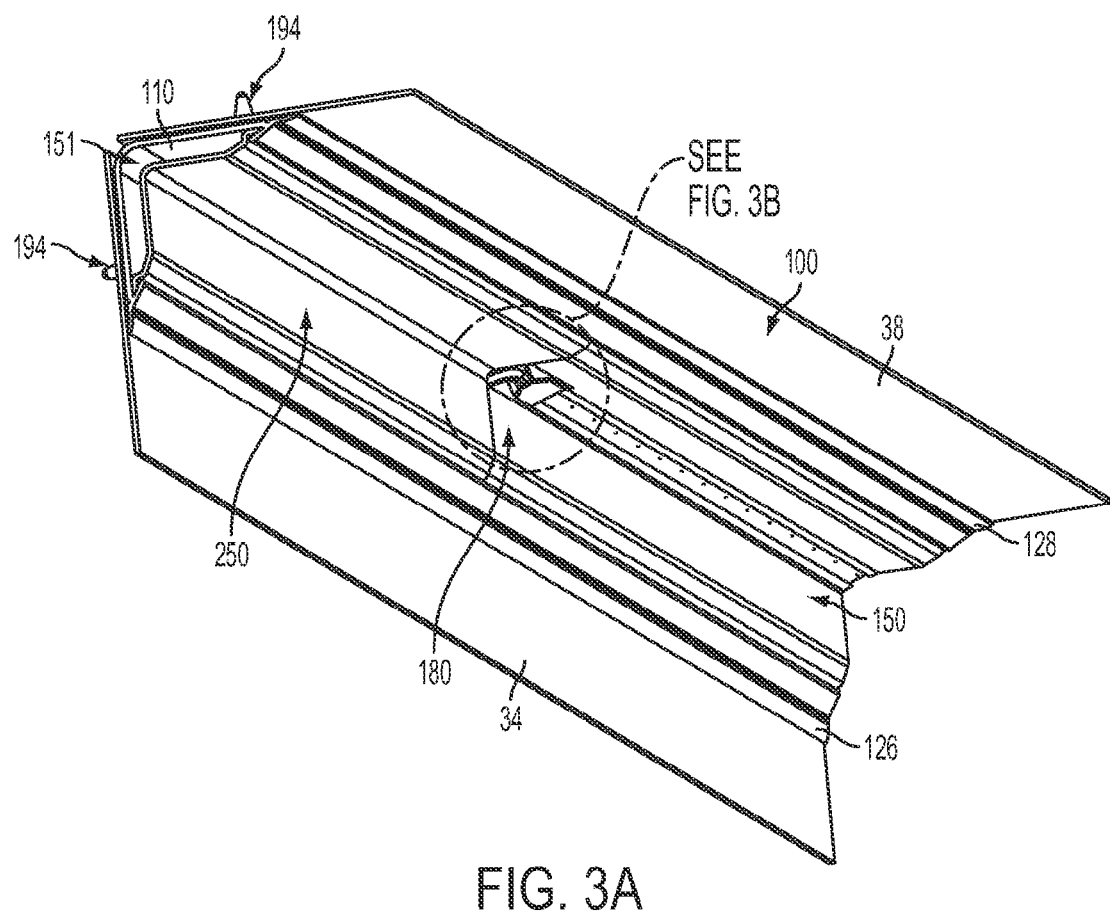
FIG. 3A is a partial perspective view of the lighting assembly shown in FIGS. 1A and 1B.
Figure 3B:
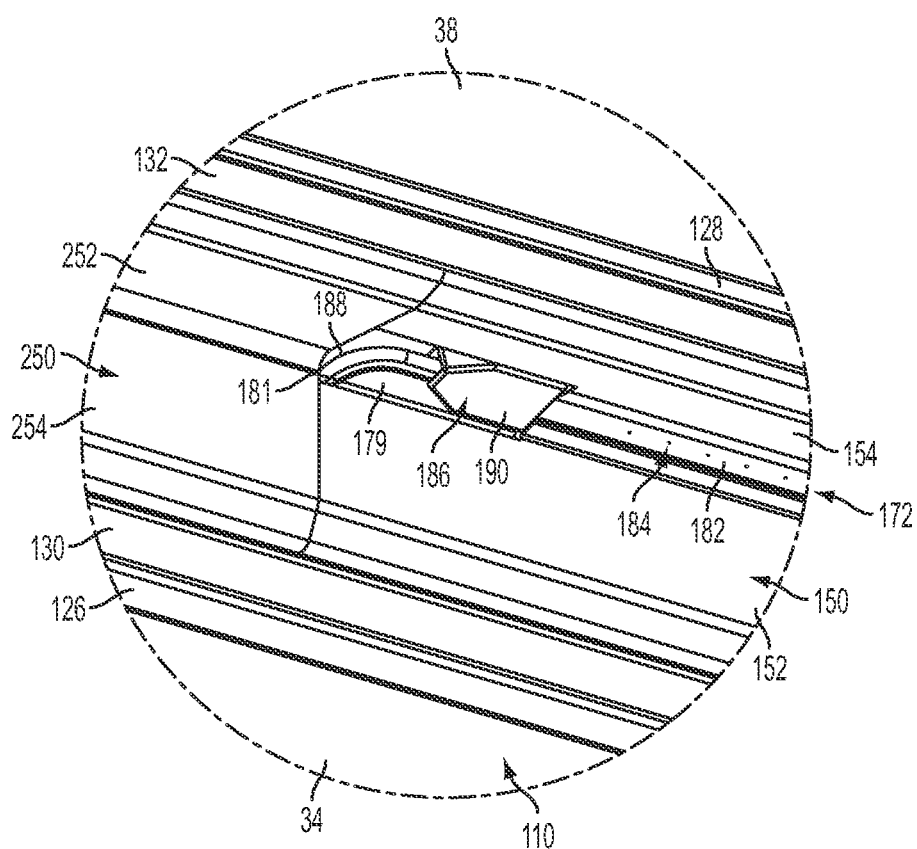
FIG. 3B is an enlarged view of the portion of the lighting assembly indicated in FIG. 3A.
Figure 5:
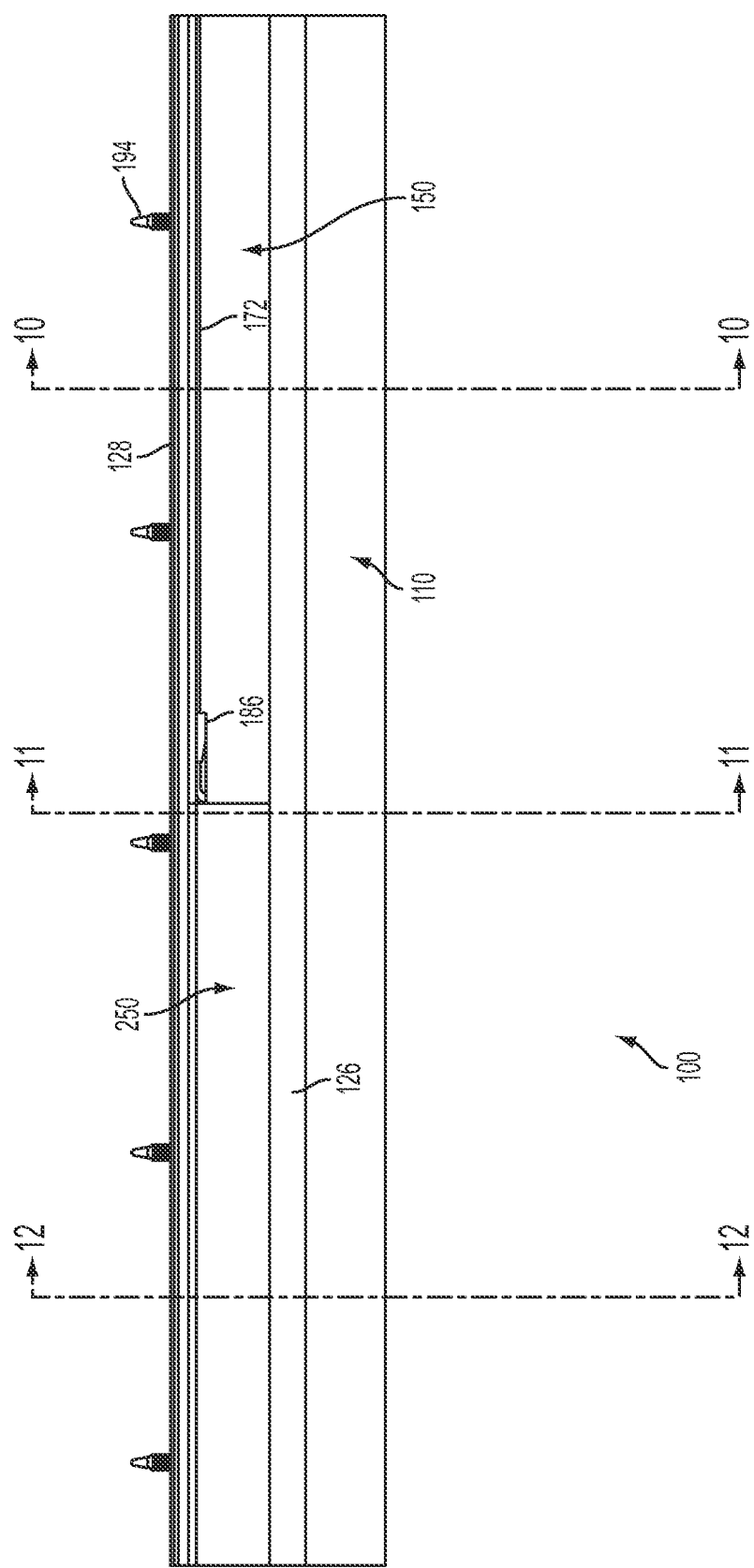
FIG. 5 is a side view of the lighting assembly shown in FIGS. 3A and 3B.
Figure 6:
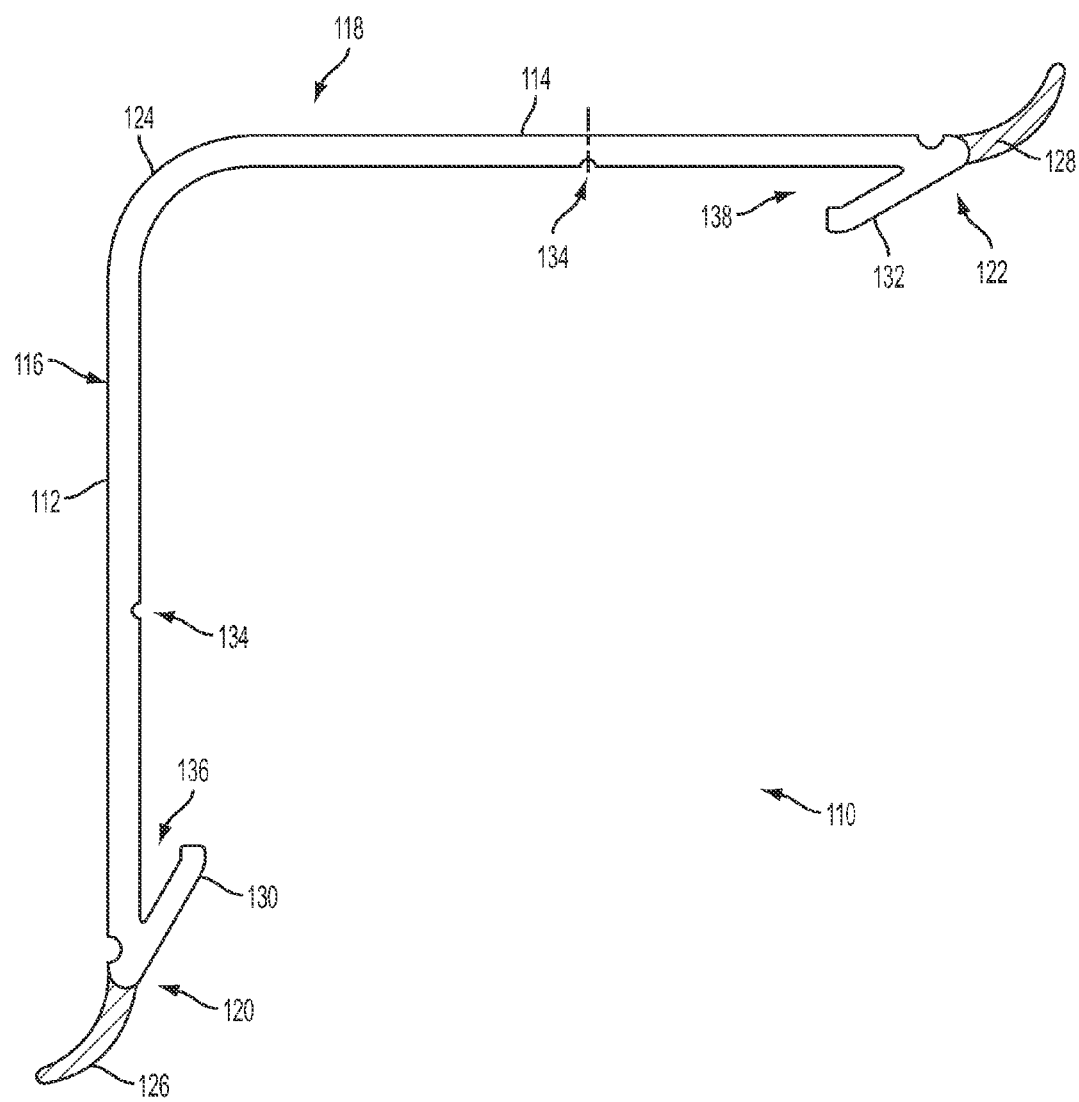
FIG. 6 is an enlarged cross-sectional view of a molding portion of the lighting assembly shown in FIGS. 3A and 3B.

Referring additionally to FIGS. 3A, 3B and 5, a lighting assembly 100 is mounted in each of the longitudinally extending top corners of the trailer. In the illustrated embodiments, each lighting assembly 100 includes at least a back, or molding, portion 110 that is elongated in the direction of the intersection between the side wall and the roof and secured to inner liner 38 of the roof assembly and inner liner 34 of a corresponding side wall assembly 16 by fasteners 194 (for example, nylon insert fasteners or screws), one or more elongated covers 150 that have a light source retaining groove and that are removably secured in the molding portion as described herein, and/or one or more elongated covers 250 that do not have a light source retention groove and that are removably secured in molding portion 110, and at least one lighting strip 180 that is slidably, by snap fit, or adhesively received in light cover 150, as described in greater detail below. As seen in FIG. 6, elongated molding portion 110 includes an elongated first web 112 having a proximal edge 116 and a distal edge 120, and an elongated second web 114 having a proximal edge 118 and a distal edge 122. Proximal edges 116 and 118 are joined by a corner 124 (in this embodiment in the form of a smooth, continuous radiused corner) from which first web 112 and second web 114 extend outwardly, first web 112 and second web 114 being substantially perpendicular to each other.

Distal edges 120 and 122 of first web 112 and second web 114 include respective elongated, resilient sealing flanges 126 and 128 extending therefrom. As shown, sealing flanges 126 and 128 are both in an at-rest, non-flexed position, in which they curve outwardly away from the outer surfaces of the corresponding first and second webs. Sealing flanges 126 and 128 are, however, formed of a flexible, resilient material, such as but not limited to a flexible polyvinyl chloride (PVC), whereas first web 112 and second web 114 are formed of a rigid PVC material, the webs and the sealing flanges being co-molded with each other. When force is exerted on sealing flanges 126 and 128, such as when molding portion 110 is mounted to the corresponding side wall structure 16 and roof structure 22 of the trailer, sealing flanges 126 and 128 bend inwardly toward the interior cargo compartment and the inner surfaces of the corresponding first and second webs, against the corresponding inner liners, so that each sealing flange is substantially aligned with its corresponding web and parallel to its opposing inner liner panel, as shown in FIG. 2. Because back portion 110, alone or in combination with light cover 150 and/or non-lighted cover 250 (described below), forms a solid surface extending between the side wall and roof inner liners, the seals provided at the molding assembly edges by sealing flanges 126 and 128 inhibit air leak flow from the interior cargo compartment into the trailer structure behind the molding assembly. At either longitudinal end of the molding assembly, i.e. at the assembly's respective ends that abut the rear frame assembly and the front wall, the molding assemblies may define resilient members biased toward, and that seal the molding portion or cover portion of the assembly against, the rear frame and the front wall. Alternatively, the molding assembly may end in abutting engagements with the rear frame and front wall, which are sealed with a suitable adhesive sealant. Still further, molding assemblies may be disposed along the intersection of the rear frame and the roof, and at the intersection of the front wall and the roof, and these four elongated molding assembly sections joined by four corner molding pieces that engage the four elongated sections in a sealing fit and that sealingly engage the side walls, the roof, and the front wall or the rear frame.

First web 112 and second web 114 each additionally includes an elongated retention flange 130 and 132, extending inwardly from the web's distal edges 120 and 122, respectively, at an acute angle with respect to a plane of the generally planar surface of its corresponding web. Retention flanges 130 and 132 thereby form respective retention recesses 136 and 138 between themselves and the inner surfaces of corresponding webs 112 and 114. Retention flanges 130 and 132 facilitate the assembly and disassembly of light cover 150 and non-light cover 250 within molding portion 110 of lighting assembly 100, as discussed in greater detail below.

Figure 7:
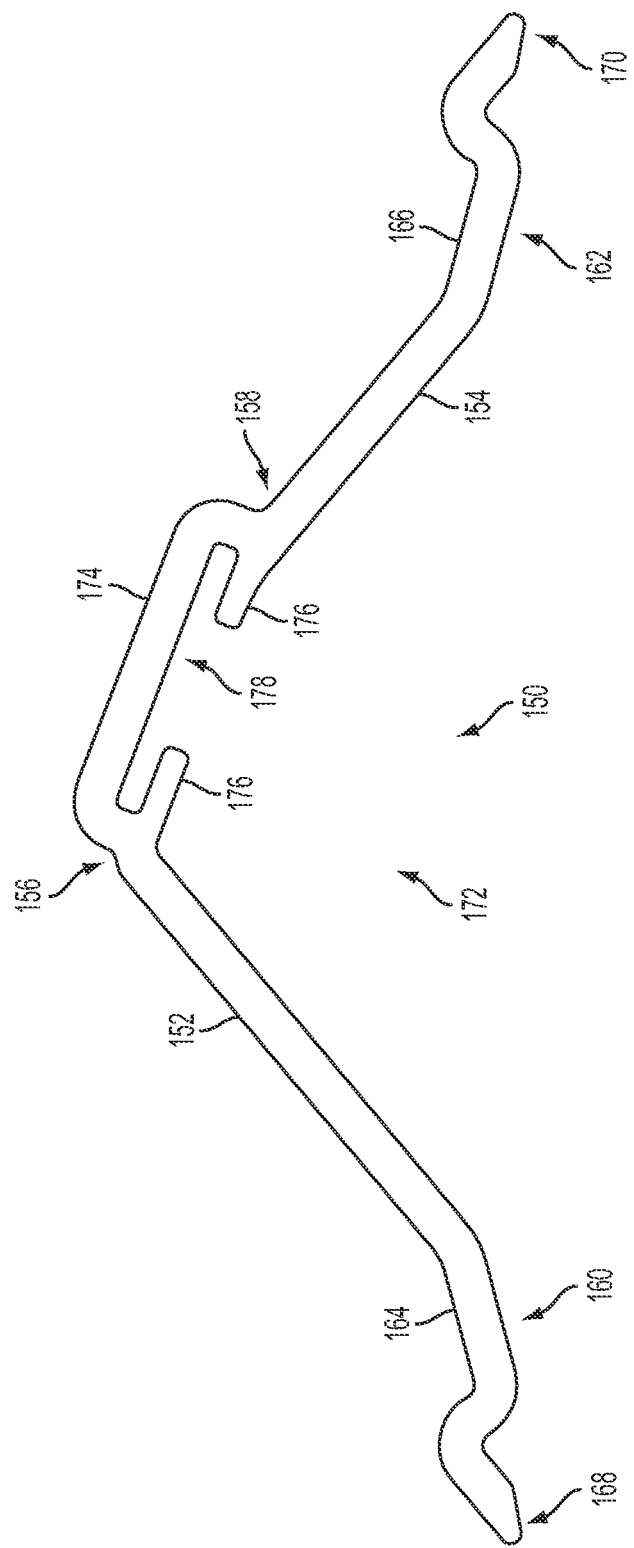
FIG. 7 is an enlarged cross-sectional view of a cover portion of the lighting assembly shown in FIGS. 3A and 3B, having a configuration for a light source.

Referring now to FIG. 7, elongated light cover 150 includes an elongated first web 152 having a proximal edge 156 and a distal edge 160, and an elongated second web 154 having a proximal edge 158 and a distal edge 162. Proximal edges 156 and 158 are both adjacent opposing sides of a light retention track 172 with first web 152 and second web 154 extending outwardly therefrom. Similarly to molding portion 110 of light assembly 100, the two webs comprising the light cover (in this instance first web 152 and second web 154) are generally planar and are disposed substantially perpendicular, or in this instance at a slightly obtuse angle, with respect to each other. First web 152 and second web 154 form an angle between their inner surfaces that is greater than 90°, in this example about 100° plus or minus 1°. Distal edges 160 and 162 include respective wall portions 164 and 166 that depend outwardly from an outer surface of the corresponding web at an obtuse angle slightly under 180°, and terminate their distal ends with elongated retention flanges 168 and 170, respectively. Each retention flange 168 and 170 is concave in its surface facing toward the interior cargo compartment. Referring again to FIG. 2, retention flanges 168 and 170 are configured to be removably received in corresponding retention recesses 136 and 138 of first web 112 and second web 114, respectively, of molding portion 110. In the presently described embodiment, light cover 150 is formed of acrylonitrile butadiene styrene (ABS), although other resilient polymer or other materials may be used for the cover and/or the molding portions as desired.

Figure 4:
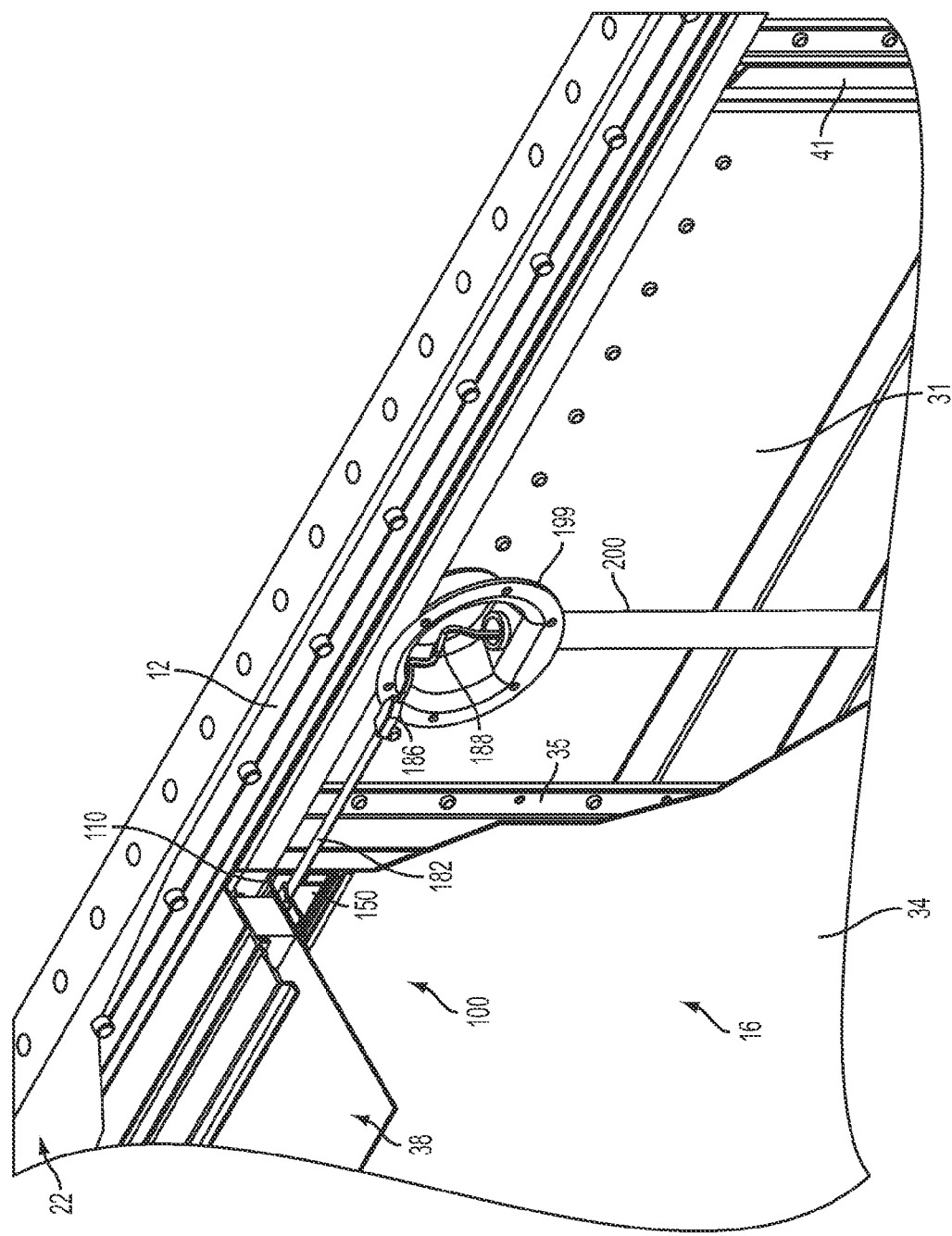
FIG. 4 is a perspective, cut-away view of the cargo trailer shown in FIGS. 1A and 1B, showing the lighting assembly.
Figure 8A:
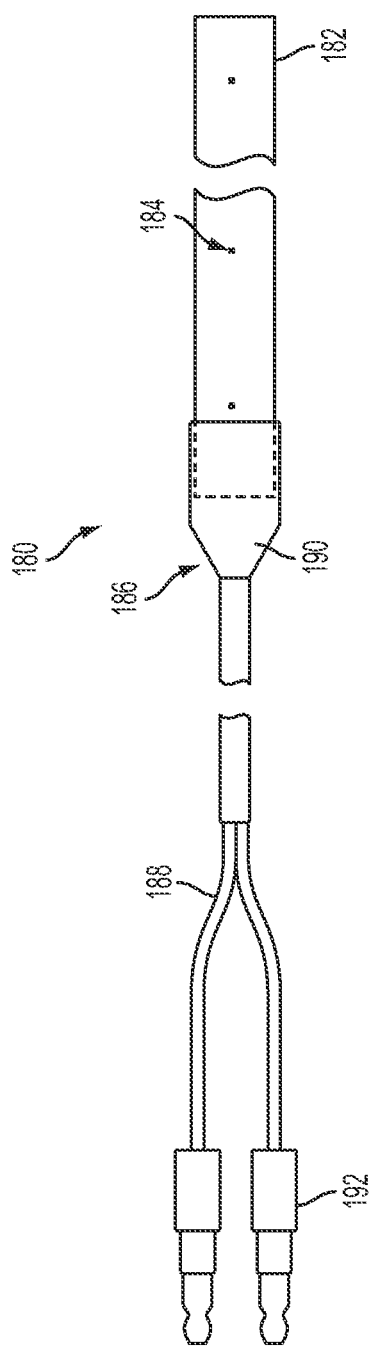
FIGS. 8A and 8B are top and side views, respectively, of a light source for use with the lighting assembly shown in FIGS. 3A and 3B.
Figure 8B:
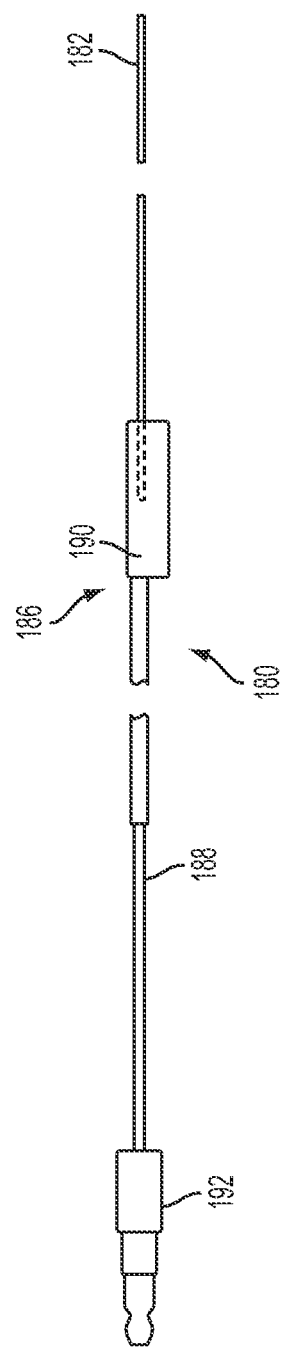
Figure 10:
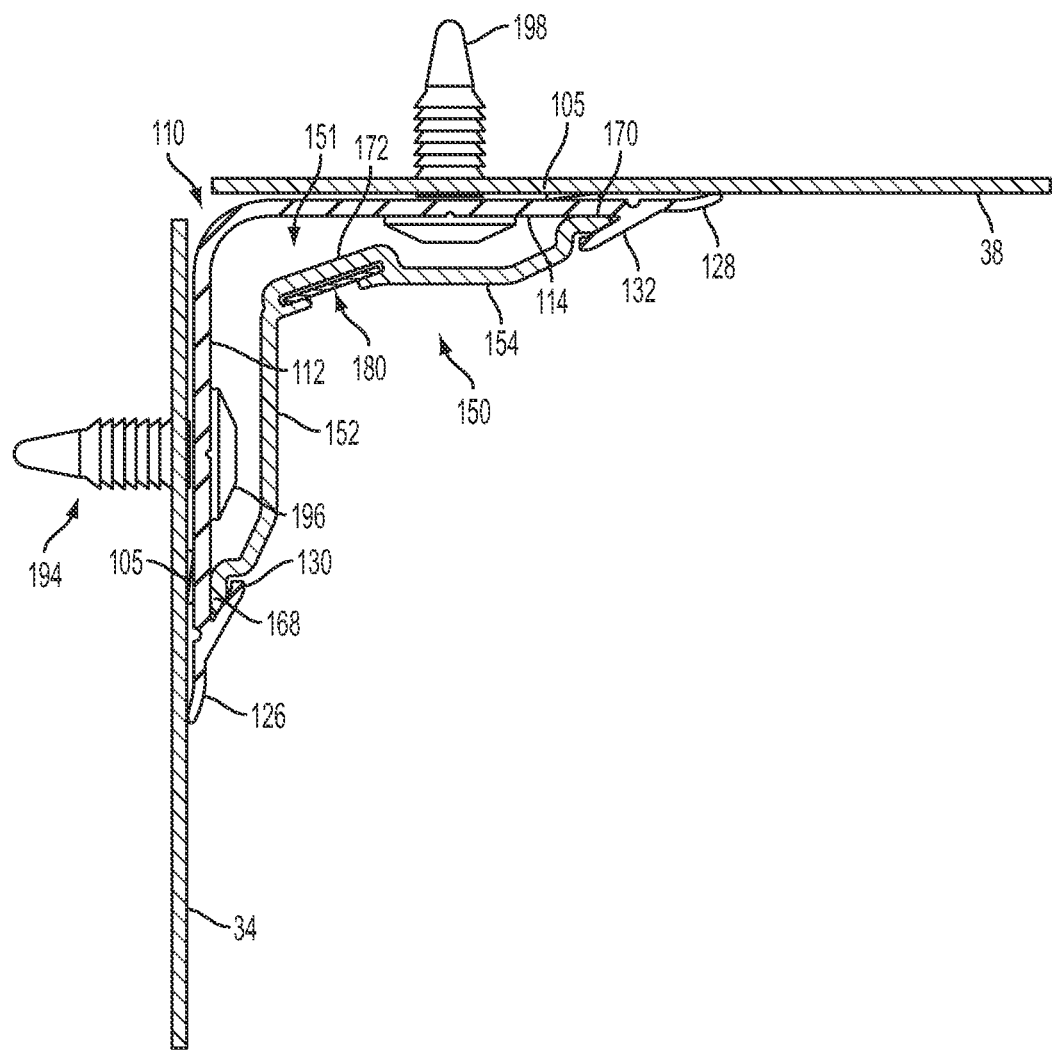
FIG. 10 is a cross-sectional view of the lighting assembly shown in FIGS. 3A and 3B, taken along line 10-10 of FIG. 5.

Light retention track 172 of light cover 150 includes a base wall 174 and a pair of inwardly depending flanges 176 that are substantially parallel to base wall 174 and define an elongated (in the direction of the longitudinal length of the interior cargo compartment) recess 178 therebetween. Elongated recess 178 of light retention track 172 is configured to slidably or by snap fit receive a laminated strip 182 of a corresponding lighting strip 180, as seen in FIG. 10. Referring additionally to FIGS. 8A and 8B, each light strip 180 includes a plurality of light emitting diodes (LEDs) or other suitable light emitting device(s) 184 that are evenly spaced along the laminated strip. One end of laminated strip 182 terminates at a wiring harness 186 that is surrounded by a polymer or rubber overmold or encapsulation 190 and that receives lead wires 188 that are connected to laminated strip 182 to thereby establish an electric circuit that includes the LEDs to provide power to actuate the LEDs. The wiring harness puts the leads in electrical communication with the plurality of LEDs in the strip so that application of electricity from a power source to lead wires 188 provides electric current to LEDs 184. Lead wires 188 include electrical terminals 192 at their distal ends so that each lighting strip 180 may be electrically connected to a power source. As seen in FIG. 3B, one end of light retention track 172 defines a harness recess 179 that is recessed outward away from the interior cargo compartment and that is configured to receive wiring harness 186 of a corresponding light strip 180 so that the wiring harness is substantially flush at its outermost surface with, or slightly proud of, the surfaces of inwardly depending flanges 176 (FIG. 7) of light retention track 172 facing the cargo compartment. Additionally, an aperture 181 is formed in a portion of harness recess 179 to allow lead wires 188 to pass through light cover 150 and into a gap 151 defined between light cover 150 and molding portion 110 of molding assembly 100, thereby hiding lead wires 188 from view from the interior cargo compartment. Referring also to FIG. 4, which for clarity eliminates back portion 110 and light cover portion 150 of the molding assembly from view in the portion of the molding assembly at which wiring harness 186 is disposed, lead wires 188 run along gap 151 (FIG. 2) until they eventually pass through an aperture 127 (FIG. 11) in back portion 110 and pass into a junction box 199 and thereby through a riser duct or conduit 200 (FIG. 4) that is disposed in the corresponding side wall structure 16. The leads run through conduit 200 to connect with an electric main running along the trailer's bottom rail. In another embodiment, the lighting strip may be configured with a plug, and a wiring harness may be wired from the bottom rail trailer main through conduit 200 so that the wiring harness may plug directly in to the strip plug. Still further, where leads 188 are relatively short, a wiring harness may be wired up from the bottom rail trailer main so that the wiring harness sits in box 199, allowing leads 188 from one or more strips 180 to plug into the wiring harness at box 199. Also, leads 188 may run from conduit 200, through the bottom rail directly to the main trailer harness. Various electrical arrangements are possible, for example to facilitate lighting strip replacement as needed.

A lighting strip 180 that may be used in structures in accordance with the embodiments described herein is sold under the name LIGHTFORM available from Grote Industries of Madison, Ind. It should be understood, however, that such light source is presented herein for purposes of example only and that other light sources, for example standalone light sources, battery powered light sources, and/or substrate-based light sources other than LEDs, may be used. Further, for example, the substrate of laminated strip 182 may be formed with an adhesive on one side, so that the strip may be adhesively secured to base wall 174 and depending flanges 176 omitted from the structure of light retention track 172.

Figure 9:
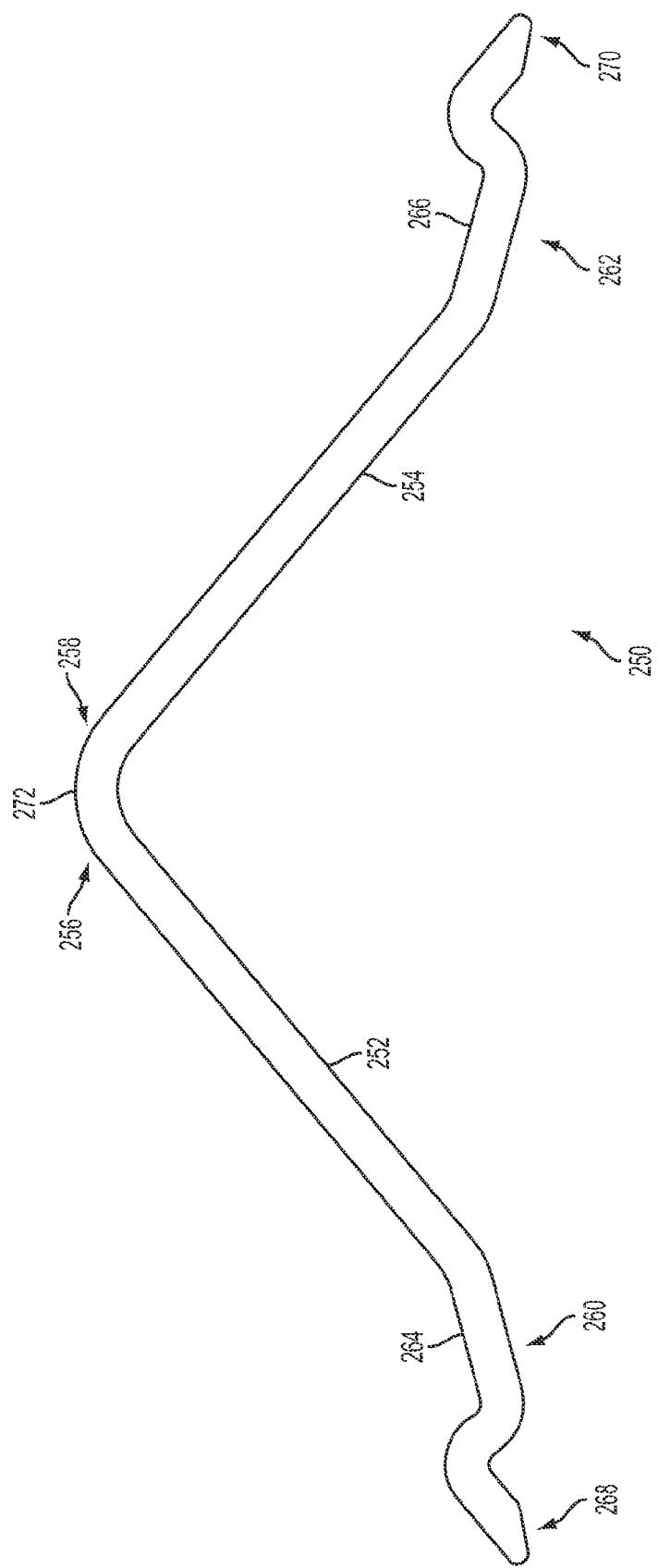
FIG. 9 is an enlarged cross-sectional view of a cover portion of the lighting assembly shown in FIGS. 3A and 3B, without a configuration for a light source.
Figure 12:
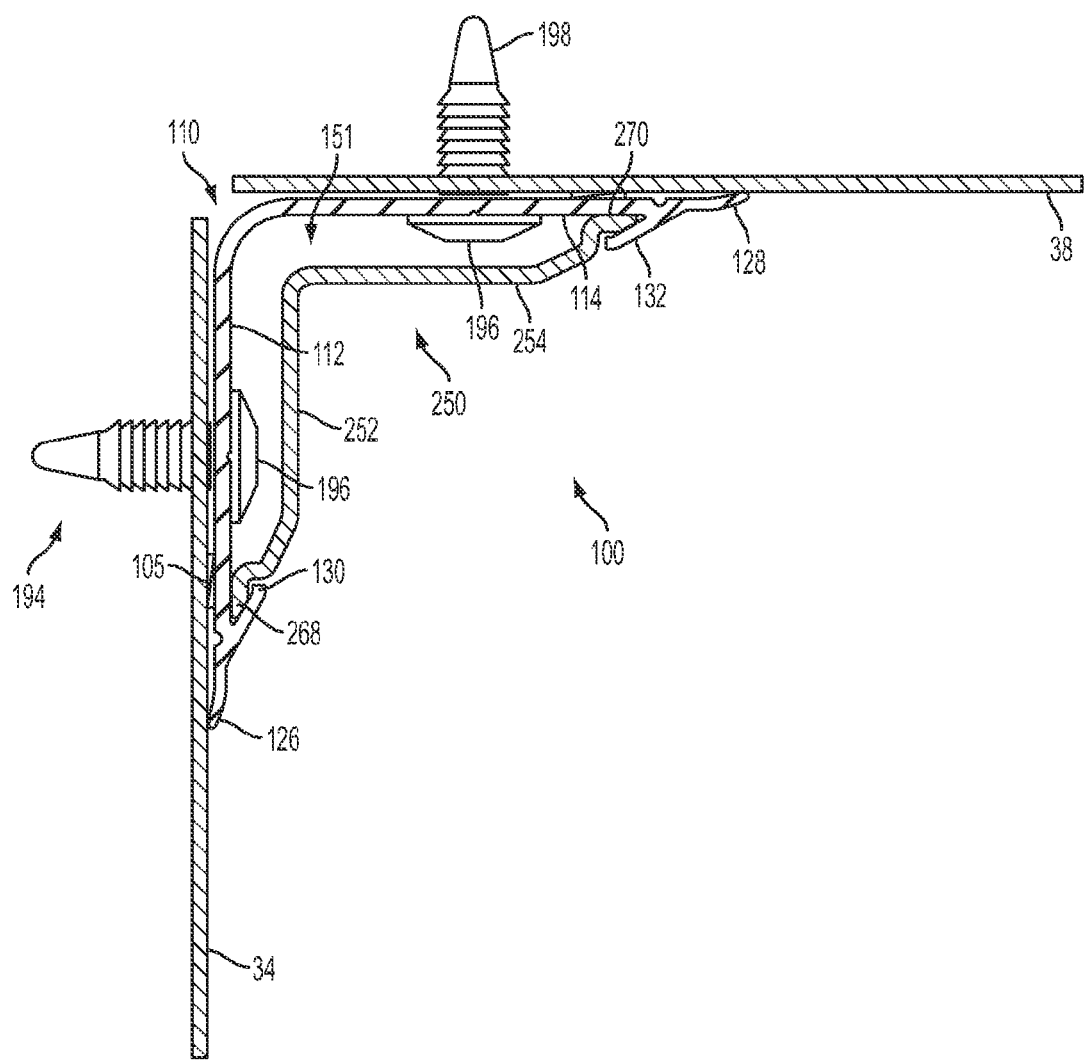
FIG. 12 is a cross-sectional view of the lighting assembly shown in FIGS. 3A and 3B, taken along line 12-12 of FIG. 5.

Referring now to FIG. 9, elongated non-light cover 250 preferably includes an elongated first web 252 having a proximal edge 256 and a distal edge 260, and an elongated second web 254 having a proximal edge 258 and a distal edge 262. The proximal edges of first web 252 and second web 254 are joined at a smooth, continuous-radiused corner 272, with the first and second webs extending outwardly therefrom at a substantially perpendicular manner or slightly obtuse angle (in this example, 100°+/−1°) with respect to each other. Similarly to elongated light cover 150, the inner surfaces of first web 252 and second web 254 of non-light cover 250 are generally planar and define an angle with respect to each other that is slightly greater than 90°. Also, similarly to light cover 150, the distal edges at first web 252 and second web 254 of non-light cover 250 include wall portions 264 and 266, respectively, that depend outwardly from the outer surface of the corresponding web at an obtuse angle slightly under 180°. Wall portions 264 and 266 terminate in retention flanges 268 and 270, respectively, that are configured to be removably received in a corresponding retention recess 136 and 138, respectively, of the corresponding first and second webs of molding portion 110, as shown in FIG. 12.

Referring now to FIGS. 2, 3A and 3B, in the installation of lighting assembly 100 in the interior cargo compartment of a corresponding vehicle, elongated molding portions 110 are first secured to inner liner 38 of roof assembly 22 and inner liner 34 of the corresponding side wall assembly 16 with fasteners 194. In other embodiments, molding portions 110 are secured to the cargo compartment surfaces such as liners 34 and 38 by adhesive or adhesive tape. Although two fasteners are illustrated in the figures, it should be understood that each illustrated fastener indicates a row of a plurality of fasteners (e.g. at about 6 inch spacing) extending the length of the cargo compartment to secure each row's side of the back portion 110 of the molding assembly to the corresponding inner liner. Fasteners 194 each includes a head portion 196 that is received adjacent the inner surface of the corresponding first web 112 or second web 114 of the molding portion, and a shank portion 198 that passes through the corresponding web and into either the roof assembly or the side wall assembly. In that first web 112 and second web 114 of molding portion 110 are substantially perpendicular to each other, the outer surfaces of first web 112 and second web 114 are substantially flush with the inner surfaces of the corresponding liners.

As molding portion 110 is moved into the desired position, elongated sealing flanges 126 and 128 make contact with the corresponding side wall and roof assemblies so that the sealing flanges flex inwardly toward the cargo compartment as molding portion 110 is seated firmly against liners 32 and 38. When molding portion 110 is attached to the side wall and the roof, then, sealing flanges 126 and 128 inhibit air leak flow from the interior cargo compartment into the trailer structure behind the molding assembly. Further, strips of foam tape 105 (FIG. 10) may be adhered to the outer surfaces of first web 112 and second web 114. The adhesive sides of tape strips 105 are attached to web portions 112 and 114 prior to the molding portions' attachments to the roof and side wall.

Referring again to FIG. 6, a pair of elongated grooves 134 extend along the inward facing surfaces of both first web 112 and second web 114 and serve as guides for the positioning of fasteners 194 along the length of molding portion 110. Guide grooves 134 are disposed at a predetermined distance from the center of the arcuate center portion of molding portion 110, or correspondingly a predetermined distance from the respective distal end edges, so that the grooves align with pre-made holes or depressions in the inner liner panel or, in absence of pre-made holes or markings in the liner panel, align with positions on the side wall and roof at which the fasteners will not interfere with the top rail or other impenetrable or damageable obstruction in the side wall or roof. In the illustrated embodiments, the upper fasteners 194 secure into polystyrene block 47. In other embodiments, adhesives may be used in addition to or instead of the fasteners to secure the molding portion to the side wall and roof assemblies.

In certain embodiments as described herein, molding portion 110 is secured to the trailer interior compartment after the side wall is attached to the roof assembly but before attachment of the cover(s) to the molding/back portion. This allows the trailer's assembly in the main construction process in a consistent manner that does not vary from trailer to trailer, while allowing assembly of the lighted and non-lighted covers in a trailer-specific manner at a later time. Once the desired number of molding portions 110 are mounted in the corresponding upper corner of the cargo space, elongated light covers 150 may then be releasably mounted therein either before or after lighting strips 180 have been mounted therein. Referring additionally to FIGS. 7, 8A and 8B, in the present example, lighting strips 180 are preferably mounted within light covers 150 prior to the assembly of light covers 150 into elongated molding portions 110. First, a distal end of laminated strip 182 that is opposite wiring harness 186 of lighting strip 180 is fed into elongated recess 178 of light retention track 172. Laminated strip 182 slidably passes through elongated recess 178 until harness 186 abuts the end of light retention track 172 and is, therefore, disposed in harness recess 179, as seen in FIG. 3B.

The assembled light cover 150 and lighting strip 180 may now be assembled into the corresponding elongated molding portions 110.

In assembly of the molding assembly, and referring to FIGS. 2, 6, and 10, elongated retention flange 168 of the light cover's first web 152 may first be positioned in the corresponding retention recess 136 of the molding portion's first web 112. Light cover 150 is then pivoted upwardly in a counterclockwise manner (in the perspective of FIGS. 2, 6, and 10) toward the concave face of molding portion 110. When retention flange 170 then engages the inward facing surface of elongated retention flange 132 of the molding portion's second web 114, the installer continues to apply force to the inward-facing surface of the cover portion in a direction away from the cargo compartment and toward the concave inward surface of the molding portion. This causes web portions 152 and 154 to flex with respect to each other, i.e. reducing the normal 100° angle between the webs in the uninstalled condition, until second web retention flange 170 clears the distal end of molding portion elongated retention flange 132. Once retention flange 170 is clear of retention flange 132, the force tending to reduce the angle between second web 154 and first web 152 is released, thereby allowing the first web and the second web of light cover 150 to move back toward their original slightly obtuse relative angle as retention flange 170 becomes firmly seated in retention recess 138 in a snap fit. More specifically, when received in the molding portion, first and second webs 152 and 154 maintain a substantially 90° angle with respect to each other. The resulting constant outboard pressure (resulting from the bias to return to the original approximately 100° relative angle) creates friction between the cover and the molding, enhancing the fit and hold between the cover portion and the molding portion and evening pressure on the sealing flanges.

Figure 11:
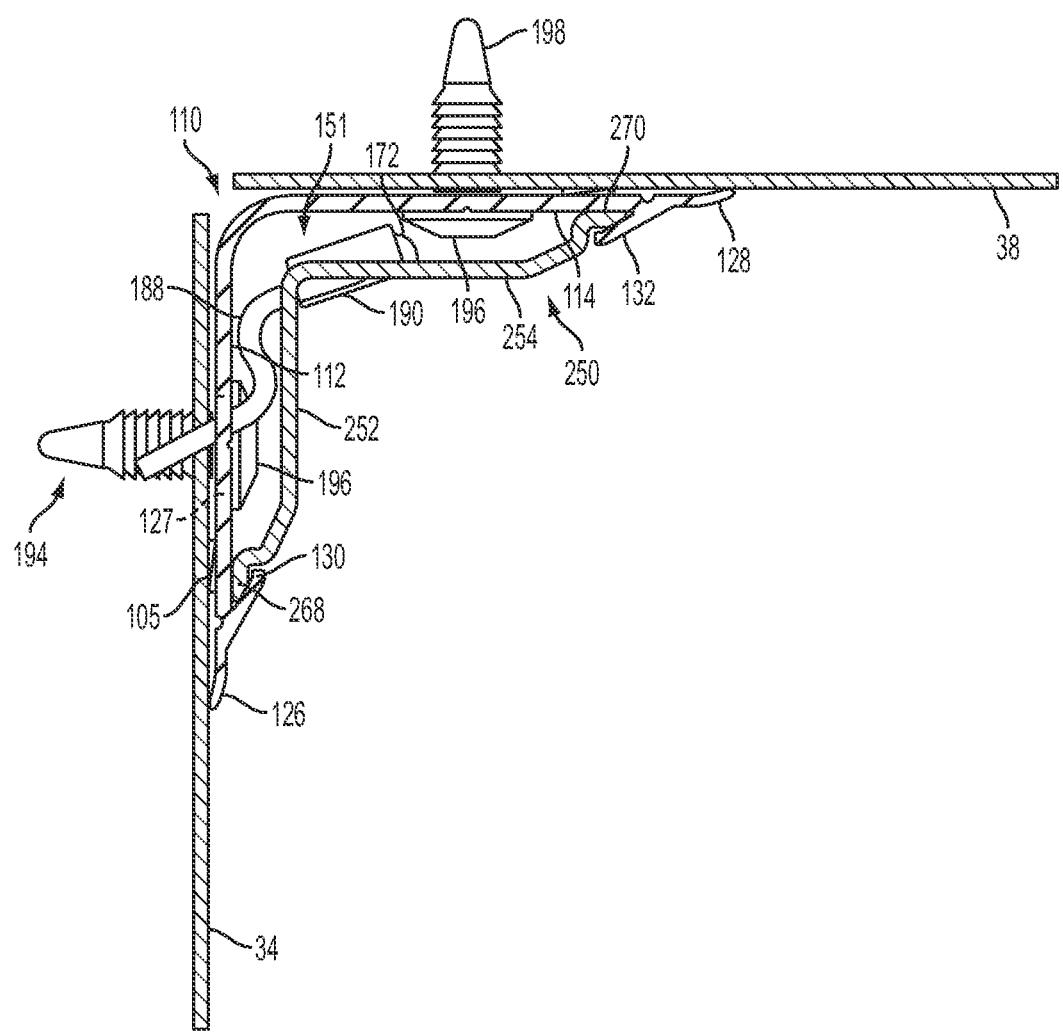
FIG. 11 is a cross-sectional view of the lighting assembly shown in FIGS. 3A and 3B, taken along line 11-11 of FIG. 5.

As described above, one or more elongated non-lighted covers 250 (FIG. 9) may also be mounted on the back/molding portion, adjacent each other or to a light cover 150, e.g. adjacent the end of light cover 150 that defines harness recess 179 so that lead wires 188 may be disposed along gap 151 that is defined between non-lighted cover 250 and molding portion 110. Insertion of non-lighted cover 250 into molding portion 110 is substantially the same as that of lighted cover 150 into molding portion 110. Referring to FIGS. 9, 11, and 12, when positioning non-lighted cover 250 in molding portion 110, retention flange 268 of the non-lighted cover's first web 252 is positioned in retention recess 136 defined by retention flange 130 of the molding portion's first web 112. Prior to pivoting non-lighted cover 250 upwardly in the counterclockwise direction about the intersection of recess 136 and flange 130 into the assembled position, lead wires 188 are passed through aperture 181 (FIG. 3B) that is defined by harness recess 179 of light cover 150 so that the lead wires may be run along gap 151. With the lead wires so positioned, non-lighted cover 250 is rotated upwardly in the counterclockwise direction toward the concave face of molding portion 110. When retention flange 270 then engages the inward facing surface of elongated retention flange 132 of the molding portion's second web 114, the installer continues to apply force to the inward-facing surface of the cover portion in a direction away from the cargo compartment and toward the concave inward surface of the molding portion. This causes web portions 252 and 254 to flex with respect to each other, i.e. reducing the normal 100° angle between the webs in the uninstalled condition, until second web retention flange 270 clears the distal end of molding portion elongated retention flange 132. Once retention flange 270 is clear of retention flange 132, the force tending to reduce the angle between second web 254 and first web 252 is released, allowing first web 252 and second web 254 to move back toward their original slightly obtuse relative angle, thereby firmly seating retention flange 270 in retention recess 138 of molding portion (FIG. 12) in a snap fit. Lead wires 188 pass through aperture 181 defined by harness recess 179 of light cover 150, but do not interfere with non-lighted cover 250, so that the adjacent ends of non-lighted cover 250 and light cover 150 may be firmly abutted against each other.

Molding/lighting assembly 100 may be disposed in the trailer so that it extends the full length of the interior cargo compartment, i.e. along the full length of one or both intersections between a side wall assembly and a roof assembly from rear frame assembly 20 (FIGS. 1A and 1B) to front wall assembly 18, but in other embodiments may be disposed along only a part of one or both such intersections, including intermittently along one or both intersections. With regard to any single extent of lighting assembly 100 within the interior cargo compartment, molding portion 110 may be a single, continuously integrally molded piece but may also be formed of a plurality of predetermined-sized molding portions 110 installed adjacently or tandemly side by side with each other over the desired length. Similarly, a single, continuously molded lighted cover 150, or non-lighted cover 250, may be attached to and cover the molding portion over an entire length of an upper cargo compartment corner from which it is desired to produce light (or not), e.g. but not limited to the entire length of the interior cargo compartment from the rear frame to the front wall. As noted above, the molding assembly (lighted or un-lighted or a mix of each) may be disposed in only one of the upper corners, or up to all four, in one or more of the vertical corners, and in any of the bottom corners, as desired. In this example, and assuming cover 150, a single lighting strip 180 (FIGS. 2, 8A, and 8B) may be received in the cover's light retention track 172 (FIGS. 7 and 3B), so that the cover defines a single harness recess 179 (FIG. 3B) to allow lead wires 188 to pass through the cover and into gap 151 (FIG. 2) between the cover and the molding portion, and thence through gap 151 for some length of the side wall/roof intersection until reaching aperture 127 (FIG. 11) in the molding portion into a receiver junction box 199 (FIG. 4) and running down the side wall (between the inner liner panel and the outer skin) through riser duct or conduit 200 (FIG. 4) to connect to an electrical main that runs in a conduit line (not shown) running along the trailer's length and secured to the trailer's bottom rail, e.g. as described in U.S. Pat. No. 6,270,150, incorporated by reference above. The main runs to the trailer front, facilitating routing in an electrical harness to a connection made to the tractor's power system (e.g. battery or alternator/generator driven by the tractor engine) to thereby provide power to lighting strip 180. The wiring may also be connected to the refrigeration unit or a standalone battery (particularly in containers or trailers without a refrigeration unit), so that the lighting strip(s) may be operated when the trailer is disconnected from the tractor. It should be understood that a respective electrical main runs on each trailer side, and that a respective box 199 and conduit 200 assembly is at each side wall, thereby allowing a similar electrical connection for light systems 100 on either side of the trailer. While the conduit 200 illustrated in FIG. 4 is disposed between the side wall's outer skin and inner liner panel, it will be understood that such arrangement is utilized in a sheet-and-post type trailer and that other arrangements are possible. In a plate trailer, for example, wiring from the lighting strip(s) may extend from the mold portion, through an aperture in the plate trailer side wall or top rail, and then to a wiring harness at the trailer front along a wiring track/conduit or a groove dedicated for electrical wiring and running along or adjacent to the top rail to the trailer front.

In other embodiments, however, light cover 150 is made in sections of predetermined size(s), each size corresponding to a predetermined length of lighting strip 180 so that there is a one to one correspondence between covers 150 and lighting strip 180, and so that the lighting strip 180 runs, or multiple strips run, the entire length of its cover 150. Accordingly, each cover portion 150 may define a respective harness recess 179. To extend the lighting system along a desired length, for example the entire length of the interior cargo compartment, multiple of the predetermined-sized lighting covers 150 are installed to the molding portion adjacently/tandemly side by side with each other over the desired length. Accordingly, multiple corresponding lead wires run through respective gaps 151 to junction box 199 and riser duct or conduit 200. Alternatively, a common junction box may be installed behind the molding assembly. In one embodiment, the trailer includes four molding portions and four corresponding covers, each molding/cover pair having a respective lighting strip and wiring harness recess. Each side of the trailer has two molding/cover assemblies, mounted side by side to extend the full length of the side. At each side, the molding/cover pair is arranged so that its harness recess 179 is at the trailer middle, i.e. the molding/cover pairs are arranged so that their harness recesses face each other, at the trailer middle. At each side, the box 199 and the conduit 200 are at the trailer middle, so that the two sets of leads 188 can be run directly from their harness recesses 179, through box 199, and down conduit 200 to connect to the main.

Similarly, where the cover is non-lighted cover 250 (FIG. 6), a single, continuously molded non-lighted cover may be attached to and cover the molding portion over an entire length of an upper cargo compartment corner for which it is desired to cover the molding portion, e.g. but not limited to the entire length of the interior cargo compartment. The non-lighted cover may be desirable where it may not be desired to produce light from the corner but where it is desirable to cover the molding portion, e.g. because the molding portion shows the heads of intermittent attachment fasteners 194, in order to present a smooth, uninterrupted surface in the upper corner. Similarly to the lighting cover 150, non-lighting cover 250 may be formed in sections of predetermined size(s), assembled on the molding portion adjacently/tandemly side by side with respect to each other over the desired length.

Still further, where it is desired to provide light to the interior cargo compartment at some portions but not others, for example where the molding portion 110 runs the entire longitudinal length of the interior cargo compartment along one or both intersections between the roof and the side walls from the rear frame assembly to the front wall assembly, lighted cover portions may be secured to the molding portion at those one or more positions along the molding portion from which the lighted cover projects light into the desired area(s) of the interior cargo compartment and non-lighted cover portions secured to the molding portion at those one or more other positions along the molding portion from which it is not desired to project light into the interior cargo compartment. In this embodiment, the cross sectional profile of covers 150 and 250 may be made correspondingly, in the sense that retention flanges 168 and 170, wall portions 164 and 166, and webs 152 and 154 (FIG. 7) of lighted cover 150 should align with retention flanges 268 and 270, wall portions 264 and 266, and webs 252 and 254 (FIG. 9) of non-lighted cover 250, so that the adjacent covers provide a continuous, smooth surface (except for the intermittent occurrence(s) of light track 172) along the length of the molding as the cover portions abut each other along the length of the molding assembly, particularly where the molding assembly extends the entire length of the intersection between the side wall and the roof, from the rear frame assembly to the front wall.

Figure 13:
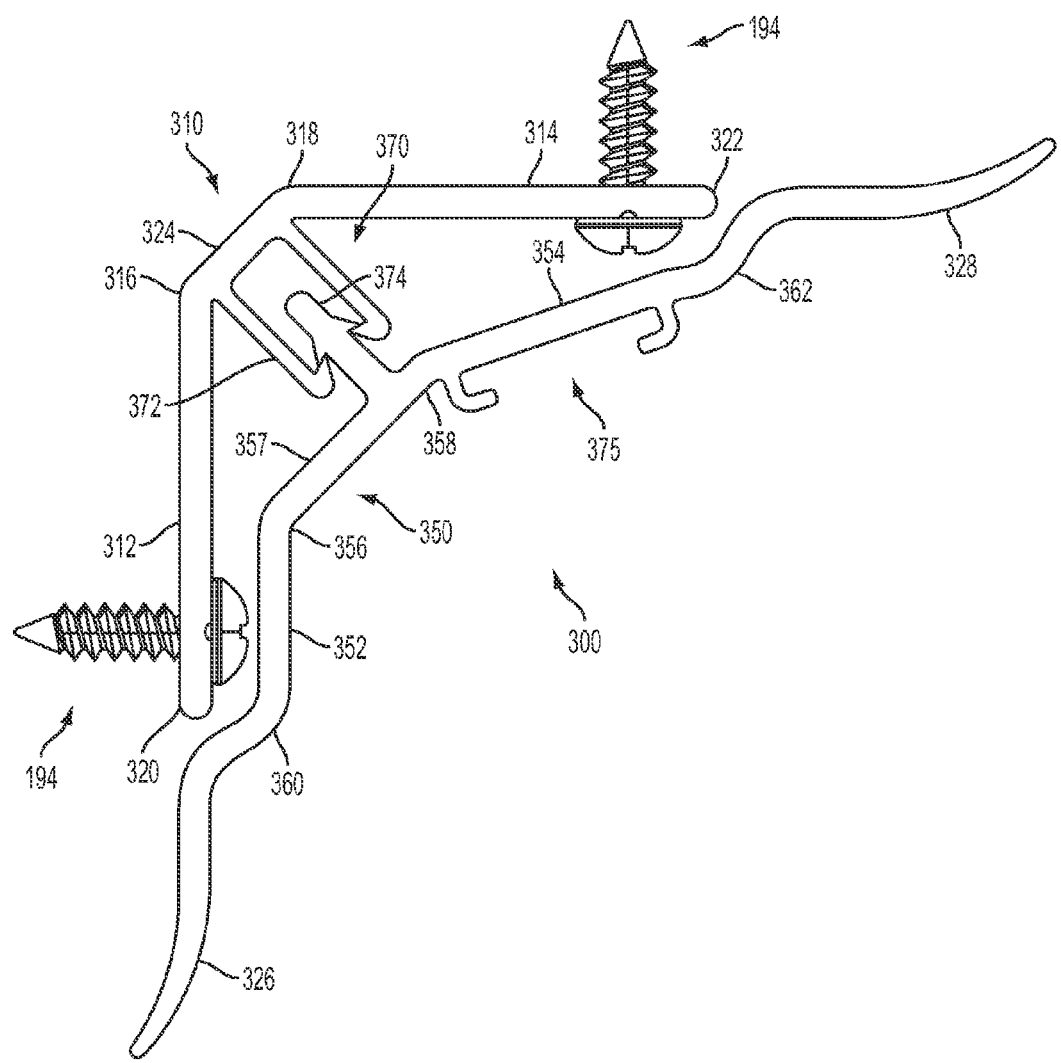
FIG. 13 is a cross-sectional view of an alternate embodiment of a lighting assembly in accordance with the present disclosure.

As shown in FIG. 13, a still further embodiment of a lighting assembly (300) includes an elongated molding portion 310 that is secured to a roof assembly and an adjacent side wall assembly of a trailer or other cargo vehicle by fasteners 194, one or more elongated light covers 350 that are removably secured in the molding portion, one or more elongated non-lighted covers (not shown) that are removably secured in molding portion 310, and at least one lighting strip 180 (FIGS. 8A and 8B) that is slidably received in light cover 350, as described in greater detail below. As shown, elongated molding portion 310 includes an elongated first web 312 having a proximal edge 316 and a distal edge 320, and an elongated second web 314 having a proximal edge 318 and a distal edge 322. Proximal edges 316 and 318 are joined by a base wall 324 from which first web 312 and second web 314 extend outwardly, first web 312 and second web 314 being substantially perpendicular to each other.

Elongated light cover 350 of lighting assembly 300 includes an elongated first web 352 having a proximal edge 356 and a distal edge 360, and an elongated second web 354 having a proximal edge 358 and a distal edge 362. Proximal edges 356 and 358 are both adjacent opposing sides of a base wall 357 with first web 352 and second web 354 extending outwardly therefrom. First web 352 and second web 354 of light cover 350 are generally planar and are disposed at an obtuse angle with respect to each other. Distal edges 360 and 362 of first web 352 and second web 354 include respective elongated, resilient sealing flanges 326 and 328 extending therefrom. As shown, sealing flanges 326 and 328 are both in an at-rest position, in which they curve outwardly away from the outer surfaces of the corresponding first and second webs. Sealing flanges 326 and 328 are, however, preferably formed of a flexible material, such as but not limited to flexible PVC, whereas first web 352 and second web 354 are formed of a rigid polyvinyl chloride material, the webs and the sealing flanges being co-molded with each other. When force is exerted on sealing flanges 326 and 328, such as when light cover 350 is secured to the corresponding molding portion 310, sealing flanges 326 and 328 bend inwardly toward the interior cargo compartment and the inner surfaces of the corresponding first and second webs so that each sealing flange is substantially parallel to its opposing inner liner panel. As shown, light cover 350 is preferably secured to the corresponding molding portion by means of a plurality of male/female type fasteners 370 that extend intermittently along the length of the lighting assembly or that is formed by a female trough 372 extending the length of the molding portion and a corresponding male ridge extending along the length of the cover. Although female portion 372 is shown as being disposed on molding portion 310 and male portion 374 is shown as being disposed on light cover 350, their positions can be reversed. In either embodiment, the walls of female portion 372 may be rigid or may be slightly flexible, to give slightly as male portion 374 is inserted. The edges of the walls of female portion 372 have flanges bent toward the interior of female portion 372 so that opposing flanges on the sides of male portion 374 hook into the female portion, thereby retaining the cover to the molding portion. At least one of female portion 372 and male portion 374 is flexible, so that the cover can be removed from the molding portion upon application of sufficient separating force.

Additionally, light cover 350 includes a light retention track 375, similar to that in the embodiments discussed above with regard to FIG. 7, for slidably receiving a laminated strip 182 of a corresponding lighting strip 180 (FIGS. 8A and 8B). Track 375 includes a harness recess (not shown) extending away from the interior cargo compartment, similar to the track of FIGS. 3A and 11, with a hole to allow the light strip lead wires to extend into the space between the molding portion and the cover portion.

Sealing flanges 326 and 328 on the cover piece serve the same function as the sealing flanges on the molding portion 110 of FIGS. 1A-12, i.e. inhibiting air leak flow from the interior cargo compartment into the trailer structure behind the molding assembly. Foam tape may, as in the embodiments described with respect to FIGS. 1A-12, be disposed on the wall/roof side surfaces of webs 312 and 314. Adhesive sealant, foam tape, or a tight grommet may be used to define a hole through molding portion 310 through which the light strip wire leads pass, to inhibit such air path.

As illustrated in FIG. 12, the light track is disposed substantially directly in the corner between the side wall assembly and the roof assembly, so that the light strip in the track faces along an axis directed perpendicularly from the track's planar front face, generally at about a 45° angle downward into the interior cargo compartment. In the embodiment illustrated in FIG. 13, however, the light strip track 374 is disposed on the right hand (in the perspective shown in FIG. 13) web 354, so that the light strip faces into the cargo compartment at a more downward direction, i.e. a greater obtuse angle between a line perpendicular to the plane of the strip/track 374 and the plane of roof assembly 22 and a lesser acute angle between that line and the plane of side wall assembly 16. Thus, the light track of the embodiment of FIG. 13 provides more light at the edges of the interior cargo compartment, for example at the locations of side doors in the trailer or container.

FIG. 13 illustrates, moreover, one example of variation in the design of lighting assembly 100. In both molding portion examples illustrated herein, the web portions are disposed parallel to and generally flush against their opposing liner panels. This, together with a generally conforming shape of the cover portion, minimizes the intrusion into the cargo body's or cargo vehicle's interior cargo compartment. Notwithstanding, it should be understood that many variations in the shapes of the molding portion and the cover portions are possible, and for example may present more of a smooth, single web extending generally at about a 45° angle between the side wall and the roof assembly over the entire extent of the cover and in parts of the molding. Thus, it should be understood that the configurations illustrated herein are for purposes of example only.

While one or more embodiments of the present invention have been described above, it should be understood that any and all equivalent realizations of the present invention are included within the scope and spirit thereof. Thus, the embodiments presented herein are by way of example only and are not intended as limitations of the present invention. Therefore, it is contemplated that any and all such embodiments are included in the present invention.

What is claimed is:

1. A cargo compartment for use with a motorized vehicle, comprising:

a floor;

a roof, a first side wall extending between the floor and the roof, defining a first intersection between the roof and the first side wall;

a second side wall extending between the floor and the roof, defining a second intersection between the roof and the second side wall, wherein the floor, the roof, the first side wall and the second side wall define an interior of the cargo compartment; and a first molding assembly disposed at the first intersection and covering the first intersection between the first intersection and the interior comprising a back portion that is elongated in a direction parallel to the first intersection that extends between a surface of the first side wall facing the interior and a surface of the roof facing the interior and that is attached to the surface of the first side wall at a position on the surface of the first side wall offset from the first intersection and to the surface of the roof at a position on the surface of the roof offset from the first intersection and so that the back portion is between the first intersection and the interior, and a cover portion that is elongated in the direction parallel to the first intersection and that is attached to the back portion so that the cover portion is disposed between the interior and a face of the back portion facing toward the interior.

2. The cargo compartment as in claim 1, comprising a first plurality of fasteners extending through the face of the back portion and into the roof at the offset position on the surface of the roof, and a second plurality of fasteners extending through the face of the back portion and into the first side wall at the offset position on the surface of the first side wall, wherein the cover portion covers the first plurality of fasteners and the second plurality of fasteners with respect to the interior.

3. The cargo compartment as in claim 1, wherein the back portion is comprised of a first generally planar web portion disposed opposite the surface of the first side wall and a second generally planar web portion disposed opposite the surface of the roof, wherein the first generally planar web portion and the second generally planar web portion are substantially perpendicular to each other and define the face of the back portion.

4. The cargo compartment as in claim 1, wherein the cover portion is configured in cooperation with the back portion so that the cover portion is retained by the back portion in a snap fit.

5. The cargo compartment as in claim 4, wherein the back portion defines a first groove at a first end of the back portion and a second groove at a second end of the back portion opposite the first end with respect to the first intersection, wherein the first groove and the second groove are generally parallel to each other, and wherein opposing edges of the cover portion are respectively received in the first groove and the second groove in the snap fit.

6. The cargo compartment as in claim 4, wherein the back portion defines one or more female grooves with one or more first flanges extending therefrom and wherein the cover portion defines one or more male extensions having one or more second flanges extending therefrom, and wherein the one or more female grooves receive the one or more male extensions so that the one or more first flanges oppose the one or more second flanges in the snap fit to retain the cover portion on the back portion.

7. The cargo compartment as in claim 1, comprising a second molding assembly disposed at the second intersection comprising
 a back portion that is elongated in a direction parallel to the second intersection and that extends between, and is attached to each of, a surface of the second side wall facing the interior and a surface of the roof facing the interior so that the back portion of the second molding assembly is between the second intersection and the interior, and
 a cover portion that is elongated in the direction parallel to the second intersection and that is attached to the back portion of the second molding assembly so that the cover portion of the second molding assembly is disposed between the interior and a face of the back portion of the second molding assembly facing toward the interior.

8. The cargo compartment as in claim 1, wherein one of the back portion and the cover portion defines a first edge in sealing engagement with the surface of the first side wall and a second edge in sealing engagement with the surface of the roof, and wherein one of, or the combination of, the back portion and the cover portion defines a continuous surface between the first edge and the second edge, thereby providing a seal inhibiting an air flow path from the interior between the first molding assembly and the first intersection.

9. The cargo compartment as in claim 8, wherein the first edge comprises a first flexible edge adjacent the surface of the first side wall, the second edge comprises a second flexible edge adjacent the surface of the roof, and the one of the back portion and the cover portion defines a body portion extending between the first flexible edge and the second flexible edge, wherein each of the first flexible edge and the second flexible edge respectively engage the surface of the first side wall and the surface of the roof with a bias force toward the respective surface of the first side wall and surface of the roof arising from the configuration of the first flexible edge and the second flexible edge with respect to the body portion.

10. The cargo compartment as in claim 8, wherein the one of the back portion and the cover portion is the back portion.

11. The cargo compartment as in claim 8, wherein the one of the back portion and the cover portion is the cover portion.

12. A cargo compartment for use with a motorized vehicle, comprising:
 a floor;
 a roof;
 a first side wall extending between the floor and the roof;
 a second side wall extending between the floor and the roof and opposing the first side wall;
 a front wall extending between the floor and the roof and extending between the first side wall and the second side wall;
 a rear frame attached at least to the floor and the roof opposite the front wall;
 wherein the floor, the roof, the first side wall, and the second side wall define an interior of the cargo compartment;
 at least one intersection between
   a first surface of one of the floor, the roof, the first side wall, the second side wall, the front wall, and the rear frame, and
   a second surface of one other of the floor, the roof, the first side wall, the second side wall, the front wall, and the rear frame; and
 a first molding assembly disposed at the at least one intersection and covering the at least one intersection between the at least one intersection and the interior, comprising
   a back portion that is elongated in a direction parallel to the at least one intersection and that extends between, and is attached to at least one of, the first surface and the second surface so that the back portion is between the at least one intersection and the interior,
   a cover portion that is elongated in the direction parallel to the at least one intersection and that is attached to the back portion so that the cover portion is disposed between the interior and a face of the back portion facing toward the interior,
   a light source disposed on at least a portion of a face of the cover portion that faces the interior and that is formed integrally with the cover portion.

13. The cargo compartment as in claim 12, wherein the light source comprises one or more light emitting diodes.

14. The cargo compartment as in claim 12, wherein the face of the cover portion defines a surface that is elongated in the direction parallel to the at least one intersection and wherein the light source is received at the surface of the face of the cover portion.

15. The cargo compartment as in claim 14, wherein the light source is an elongated substrate on which is disposed a plurality of light emitting diodes.

16. The cargo compartment as in claim 15, wherein the elongated substrate has adhesive disposed on one side thereof, and wherein the one side of the elongated substrate is attached to the surface of the face of the cover portion by the adhesive.

17. The cargo compartment as in claim 15, wherein the face of the cover portion defines a groove that includes the surface of the face of the cover portion, wherein the elongated substrate is received in a sliding fit within the cover portion groove, and wherein the cover portion groove defines edges that retain the elongated substrate in the cover portion groove in the direction of the interior.

18. The cargo compartment as in claim 12, comprising electrical wires that provide electric current to the light source, wherein the cover portion defines a hole through which the wires extend from the light source to a gap between the cover portion and the back portion.

19. The cargo compartment as in claim 18, wherein the back portion defines a hole through which the wires extend into an electrical conduit disposed in the first side wall.

20. The cargo compartment as in claim 12, wherein the light source extends over the entire length of the cover portion in the direction of the at least one intersection.

21. The cargo compartment as in claim 12, wherein the light source extends over a part of the entire length of the cover portion in the direction parallel to the at least one intersection but does not extend over an other part of the entire length of the cover portion.

22. The cargo compartment as in claim 12, wherein the back portion is attached to the first surface and to the second surface.

23. A cargo vehicle, comprising:
 a wheeled chassis;
 a floor disposed on the chassis;
 a roof;
 a first side wall extending between the floor and the roof, defining a first intersection between the roof and the first side wall;

a second side wall extending between the floor and the roof, defining a second intersection between the roof and the second side wall, wherein the floor, the roof, the first side wall and the second side wall define an interior; and a first molding assembly disposed at the first intersection and covering the first intersection between the first intersection and the interior, comprising a back portion that is elongated in a direction parallel to the first intersection that extends between a surface of the first side wall facing the interior and a surface of the roof facing the interior and that is attached to the surface of the first side wall at a position on the surface of the first side wall offset from the first intersection and to the surface of the roof at a position on the surface of the roof offset from the first intersection and so that the back portion is between the first intersection and the interior, and a cover portion that is elongated in the direction parallel to the first intersection and that is attached to the back portion so that the cover portion is disposed between the interior and a face of the back portion facing toward the interior.

24. The cargo vehicle as in claim 23, wherein the cover portion is configured in cooperation with the back portion so that the cover portion is retained by the back portion in a snap fit.

25. The cargo vehicle as in claim 23, comprising a second molding assembly disposed at the second intersection comprising a back portion that is elongated in a direction parallel to the second intersection and that extends between, and is attached to each of, a surface of the second side wall facing the interior and a surface of the roof facing the interior so that the back portion of the second molding assembly is between the second intersection and the interior, and a cover portion that is elongated in the direction parallel to the second intersection and that is attached to the back portion of the second molding assembly so that the cover portion of the second molding assembly is disposed between the interior and a face of the back portion of the second molding assembly facing toward the interior.

26. The cargo vehicle as in claim 23, wherein one of the back portion and the cover portion defines a first edge in sealing engagement with the surface of the first side wall and a second edge in sealing engagement with the surface of the roof, and wherein one of, or the combination of, the back portion and the cover portion defines a continuous surface between the first edge and the second edge, thereby providing a seal inhibiting an air flow path from the interior between the first molding assembly and the first intersection.

27. A cargo vehicle, comprising:
a wheeled chassis;
a floor disposed on the chassis;
a roof;
a first side wall extending between the floor and the roof;
a second side wall extending between the floor and the roof and opposing the first side wall;
a front wall extending between the floor and the roof and extending between the first side wall and the second side wall;
a rear frame attached at least to the floor and the roof opposite the front wall;

wherein the floor, the roof, the first side wall, and the second side wall define an interior;
at least one intersection between
a first surface of one of the floor, the roof, the first side wall, the second side wall, the front wall, and the rear frame, and
a second surface of one other of the floor, the roof, the first side wall, the second side wall, the front wall, and the rear frame; and
a first molding assembly disposed at the at least one intersection and covering the at least one intersection between the at least one intersection and the interior, comprising a back portion that is elongated in a direction parallel to the at least one intersection and that extends between, and is attached to at least one of, the first surface and the second surface so that the back portion is between the at least one intersection and the interior, a cover portion that is elongated in the direction parallel to the at least one intersection and that is attached to the back portion so that the cover portion is disposed between the interior and a face of the back portion facing toward the interior, and a light source disposed on at least a portion of a face of the cover portion that faces the interior and that is formed integrally with the cover portion.

28. The cargo vehicle as in claim 27, wherein the face of the cover portion defines a surface that is elongated in the direction parallel to the at least one intersection and wherein the light source is received at the surface of the face of the cover portion.

29. The cargo vehicle as in claim 28, wherein the light source is an elongated substrate on which is disposed a plurality of light emitting diodes.

30. The cargo vehicle as in claim 29, wherein the face of the cover portion defines a groove that includes the surface of the face of the cover portion, wherein the elongated substrate is received in a sliding fit within the cover portion groove, and wherein the cover portion groove defines edges that retain the elongated substrate in the cover portion groove in the direction of the interior.

31. The cargo vehicle as in claim 27, comprising electrical wires that provide electric current to the light source, wherein the cover portion defines a hole through which the wires extend from the light source to a gap between the cover portion and the back portion.

32. The cargo vehicle as in claim 27, wherein the light source extends over the entire length of the cover portion in the direction parallel to the at least one intersection.

33. A cargo compartment for use with a motorized vehicle, the cargo compartment comprising:
a floor;
a roof that is substantially parallel to the floor;
a first side wall and a second side wall extending between the floor and the roof, wherein an intersection of the first side wall and the roof defines a first corner and wherein the roof, the floor, the first side wall, and the second side wall define an interior of the cargo compartment; and
a first lighting assembly comprising:
a back portion elongated in a direction parallel to the intersection and including an elongated first web having an elongated retention recess and an elongated second web having an elongated retention recess that intersect at a corner, wherein the back portion is fixed at the first corner of the cargo compartment between the first corner and the interior, with the first web in abutment with the first side wall and the second web in abutment with the roof;

a first cover portion elongated in the direction and attached to the back portion so that the first cover portion is disposed between the interior and the back portion, the first cover portion including an elongated first web defining a retention flange disposed along a distal edge of the elongated first web, an elongated second web defining a retention flange disposed along a distal edge of the elongated second web, and an elongated light retention track formed integrally within the first cover portion and extending between the first web and the second web of the first cover portion; and a light source on a substrate that is elongated in the direction and that is received within the light retention track of the first cover portion, wherein the retention flange of the first web of the first cover portion is received in the retention recess of the first web of the back portion, and the retention flange of the second web of the first cover portion is received in the retention recess of the second web of the back portion, so that the first cover portion is removably secured to the back portion.

34. The cargo compartment of claim 33, wherein the first web and the second web of the back portion are substantially perpendicular to each other.

35. The cargo compartment of claim 34, wherein the first web and the second web of the back portion are formed of a rigid polyvinyl chloride material.

36. The cargo compartment of claim 35, wherein the first web and the second web of the back portion each further comprise a sealing flange extending along its distal edge, wherein the sealing flanges are comprised of a flexible material.

37. The cargo compartment of claim 33, wherein the light retention track further comprises a base wall and a pair of opposed radially-inwardly depending flanges that define an elongated recess, and the elongated light source is slidably received within the elongated recess defined by the opposed radially-inwardly depending flanges.

38. The cargo compartment of claim 37, wherein the elongated light source further comprises a laminated strip including a plurality of light emitting diodes disposed along its length.

39. The cargo compartment of claim 33, wherein the elongated light source further comprises lead wires that provide power from a power source to the light source, wherein the lead wires are disposed within an elongated recess defined between the back portion and the first cover portion.

40. The cargo compartment of claim 33, wherein the first web and the second web of the back portion are fixed to the side wall and the roof, respectively, by fasteners, each fastener having a head portion adjacent an inner surface of a corresponding one of the first web and the second web, and a shank portion passing through the corresponding one of the first web and the second web, wherein the head portions of the fasteners are disposed in an elongated recess defined between the back portion and the first cover portion.

41. The cargo compartment of claim 39, further comprising:

an elongated second cover portion to which the light source is not attached and that comprises an elongated first web defining a retention flange disposed along a distal edge of the elongated first web of the elongated second cover portion and an elongated second web defining a retention flange disposed along a distal edge of the elongated second web of the elongated second cover portion, wherein the retention flange of the first web of the second cover portion is received in the retention recess of the first web of the back portion, and the retention flange of the second web of the second cover portion is received in the retention recess of the second web of the back portion, so that the second cover portion is removably secured to the back portion adjacent the first cover portion, the second cover portion and the back portion forming an elongated recess therebetween in which the lead wires of the light source are disposed.

* * * * *